US012671313B2

(12) United States Patent
Zhao et al.

(10) Patent No.: US 12,671,313 B2
(45) Date of Patent: Jun. 30, 2026

(54) POWER CONVERSION SYSTEM AND POWER CONVERSION MODULE

(71) Applicant: Delta Electronics (Shanghai) Co., Ltd., Shanghai (CN)

(72) Inventors: Jie Zhao, Shanghai (CN); Teng Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 210 days.

(21) Appl. No.: 18/747,430

(22) Filed: Jun. 18, 2024

(65) Prior Publication Data

US 2025/0015725 A1     Jan. 9, 2025

(30) Foreign Application Priority Data

Jul. 4, 2023    (CN) ........................ 202310815187.X

(51) Int. Cl.
    *H02M 7/483*      (2007.01)
    *H02M 1/00*      (2006.01)

(52) U.S. Cl.
    CPC ....... *H02M 1/0077* (2021.05); *H02M 1/0074* (2021.05); *H02M 7/4835* (2021.05)

(58) Field of Classification Search
    CPC .. H02M 1/007; H02M 1/0074; H02M 1/0077; H02J 7/345; H02J 7/06; H02J 7/855; H02J 9/06; H02J 2207/50
    See application file for complete search history.

(56) References Cited

U.S. PATENT DOCUMENTS

| | | | |
|---|---|---|---|
| 10,886,858 B1* | 1/2021 | Zhang | H02M 7/537 |
| 2018/0043789 A1* | 2/2018 | Goetz | H02J 7/82 |
| 2023/0088540 A1* | 3/2023 | Ren | H02M 1/0074 361/86 |
| 2025/0174742 A1* | 5/2025 | Liang | H01M 10/4264 |

FOREIGN PATENT DOCUMENTS

| | | |
|---|---|---|
| CN | 109617433 A | 4/2019 |
| CN | 113285621 A | 8/2021 |
| CN | 112924838 B | 3/2022 |

* cited by examiner

*Primary Examiner* — Alex Torres-Rivera
(74) *Attorney, Agent, or Firm* — CKC & Partners Co., LLC

(57) ABSTRACT

A power conversion system, including a first module which includes a first switching circuit, a first auxiliary power supply unit, a first capacitor and a second capacitor, a second module which includes a second switching circuit, a second auxiliary power supply unit, a third capacitor and a fourth capacitor, and a first diode. The first switching circuit is in parallel with the second capacitor, the first auxiliary power supply unit is in parallel with the first capacitor, the first capacitor is connected to the first switching circuit; the second switching circuit is in parallel with the fourth capacitor, the second auxiliary power supply unit is in parallel with the third capacitor, the third capacitor is connected to the second switching circuit; and the first switching circuit is in series with the second switching circuit, and the first diode are connected to the first capacitor and the third capacitor.

22 Claims, 22 Drawing Sheets

POWER CONVERSION SYSTEM AND POWER CONVERSION MODULE

CROSS-REFERENCE TO RELATED APPLICATION

This application claims priority to Chinese Patent Application No. 202310815187.X, filed on Jul. 4, 2023, which is hereby incorporated by reference in its entirety.

TECHNICAL FIELD

The present application relates to an electronic and electrical field and, in particular, to a power conversion system and a power conversion module.

BACKGROUND

With the rapid development of new energy power generation technology, energy storage technology has also been rapidly developed. Since the medium voltage direct-mounted energy storage system does not require grid frequency transformer, the system has few conversion stages, high operating efficiency and the ability to quickly respond to a dispatch instruction, it has significantly advantageous in high-power energy storage, a medium voltage direct current bus with energy storage system suitable for a medium voltage direct current distribution network has become a research hotspot. A battery management system (BMS) is required for operation and maintenance of a battery energy storage system. If the BMS is powered off, it will not be able to monitor batteries and ambient conditions timely, so that inconsistency in the batteries may be incurred, thereby resulting in a decreased depth of actual charge and discharge and reduced cycle life of the batteries and bringing direct economic losses, or the batteries are prone to overcharging or over-temperature to cause failures and even give rise to a fire or an explosion. Therefore, an auxiliary power supply circuit is necessary in any working mode for uninterrupted power supply, and high reliability is required for the auxiliary power supply. If, for the auxiliary power supply of the energy storage system, power is only drawn from a battery side, when the battery is in a power lack state, since an under-voltage protection action makes the battery stop discharging, the requirement of uninterrupted power supply would not be met, thereby bringing safety hazards, moreover, the cost of energy of the energy storage battery is high, and it is easy to cause power loss and affect battery life during a long-term off-grid operation, causing poor economic efficiency.

Currently, the medium voltage direct current bus with energy storage system adopts a DC chain-type energy storage structure in most cases, and due to different voltage potentials between respective cascaded power modules and the ground, it is difficult to use a single auxiliary power supply to provide auxiliary power to all power modules. An auxiliary power supply scheme of a common power conversion system is shown in FIG. 1, where the auxiliary power supply system includes n power modules, $1 \leq i \leq n$, and each power module is provided with an auxiliary power supply 20 and an isolation transformer 30 corresponding thereto. The auxiliary power supply 20 draws power from an input port of the power module SMi through the isolation transformer 30. In light of such a power drawing approach, there is a low isolation voltage and it is easy to draw power. However, since there is an out-of-service redundant operation state when the power module SMi is functional, or the approach of drawing power from the input port of the power module is failed when a failure of the power module SMi is bypassed, the auxiliary power supply cannot be guaranteed with high reliability.

FIG. 2 is a structure of another common auxiliary power supply system, which uses a grid frequency transformer to draw power from low-voltage power grid. The power conversion system includes n power modules, where each power module is provided with an auxiliary power supply 20 and an isolation transformer 40 corresponding thereto. Connection of the low-voltage power grid is allowed via a primary side of an i-th grid frequency transformer, a secondary side of the i-th grid frequency transformer is connected to an i-th auxiliary power supply, and the i-th auxiliary power supply draws power from an i-th isolation transformer. This auxiliary power supply system draws power from the power grid with high reliability and high output power. However, each isolation transformer needs to be a grid frequency transformer, and since the grid frequency transformer needs to be designed in an insulation way according to the system voltage, the module would be bulk and inefficient, and it is difficult to achieve modular requirement.

Therefore, it is urgent to propose a power conversion system with an efficient and reliable auxiliary power supply system, and a power conversion module suitable for modularization.

SUMMARY

Some embodiments of the present application provide a power conversion system, including: at least two power modules and at least one first diode, where the at least two power modules include a first module and a second module;

the first module includes a first switching circuit, a first auxiliary power supply unit, a first capacitor and a second capacitor, where a first port of the first switching circuit is in a parallel connection with the second capacitor, a first port of the first auxiliary power supply unit is in a parallel connection with the first capacitor, the first capacitor is configured to provide charge to the first auxiliary power supply unit, and a first end of the first capacitor is connected to a first end of a second port of the first switching circuit;

the second module includes a second switching circuit, a second auxiliary power supply unit, a third capacitor and a fourth capacitor, where a first port of the second switching circuit is in a parallel connection with the fourth capacitor, a first port of the second auxiliary power supply unit is in a parallel connection with the third capacitor, the third capacitor is configured to provide charge to the second auxiliary power supply unit, and a first end of the third capacitor is connected to a first end of a second port of the second switching circuit;

the second port of the first switching circuit of the first module is in a series connection with the second port of the second switching circuit of the second module, and two ends of the first diode are connected to the first capacitor and the third capacitor, respectively.

Some embodiments of the present application provide a power conversion module, including: a first module, and a first diode connected to the first module;

where the first module includes a first switching circuit, a first auxiliary power supply unit, a first capacitor, and a second capacitor;

a first port of the first switching circuit is in a parallel connection with the second capacitor, a first port of the first auxiliary power supply unit is in a parallel connection with the first capacitor, the first capacitor is configured to provide charge to the first auxiliary power supply unit, and a first end of the first capacitor is connected to a first end of a second port of the first switching circuit.

Some embodiments of the present application provide a power conversion system and a power conversion module. The power conversion system includes a first module, a second module and a first diode. The first module includes a first switching circuit, a first auxiliary power supply unit, a first capacitor and a second capacitor, where a first port of the first switching circuit is in a parallel connection with the second capacitor, a first port of the first auxiliary power supply unit is in a parallel connection with the first capacitor, the first capacitor is configured to provide charge to the first auxiliary power supply unit. The second module includes a second switching circuit, a second auxiliary power supply unit, a third capacitor and a fourth capacitor, where a first port of the second switching circuit is in a parallel connection with the fourth capacitor, a first port of the second auxiliary power supply unit is in a parallel connection with the third capacitor, the third capacitor is configured to provide charge to the second auxiliary power supply unit. A first end of the first capacitor is connected to a first end of a second port of the first switching circuit, and a first end of the third capacitor is connected to a first end of a second port of the second switching circuit, and the second port of the first switching circuit of the first module is in a series connection with the second port of the second switching circuit of the second module, and two ends of the first diode are connected to the first capacitor and the third capacitor, respectively. With such an arrangement, an electric energy transfer loop of the first capacitor and the third capacitor is formed between the first module and the second module, and after the first capacitor is charged, the first capacitor can provide charge to the third capacitor through the electric energy transfer loop. Since the power is not drawn from a power unit, the power supply to auxiliary power supply units in respective power modules can be guaranteed when the power unit outputs a zero voltage level, and the reliability of the auxiliary power supply can be guaranteed. Moreover, there is no need to configure a grid frequency transformer in each power module, thus the volume of the module can be reduced, thereby facilitating the modularization of the power conversion system.

BRIEF DESCRIPTION OF DRAWINGS

In order to illustrate technical solutions of the present application or the existing technology more clearly, the drawings used in the description of embodiments of the present application or the existing technology will be briefly described hereunder. Apparently, the drawings in the following description are some embodiments of present application. For persons of ordinary skill in the art, other drawings can be obtained based on these drawings without any creative effort.

DESCRIPTION OF EMBODIMENTS

In order to illustrate objections, technical solutions and advantages of the present application more clearly, the technical solutions in the present application will be described hereunder clearly and comprehensively with reference to the drawings in the present application. Apparently, the described embodiments are only a part of embodiments of the present application, rather than all embodiments of the present application. All other embodiments obtained by persons of ordinary skill in the art based on the embodiments of the present application without any creative effort shall fall within the protection scope of the present application.

The terms such as "first", "second", "third" and "fourth" (if any) in the specification and the claims as well as the described drawings of the present application are used to distinguish similar objects, but not intended to describe a specific order or sequence. It will be appreciated that the data used in this way may be exchangeable under appropriate circumstances. For example, without departing from the scope of this text, first information may also be termed as second information; similarly, second information may also be termed as first information. Moreover, the terms such as "include" and "have" and any variation thereof are intended to cover a non-exclusive inclusion, e.g., processes, methods, systems, products or devices that encompass a series of steps or units are not necessarily limited to those steps or units that are explicitly listed, but may include other steps or units that are not explicitly listed or inherent to these processes, methods, products or devices.

Figure 1:
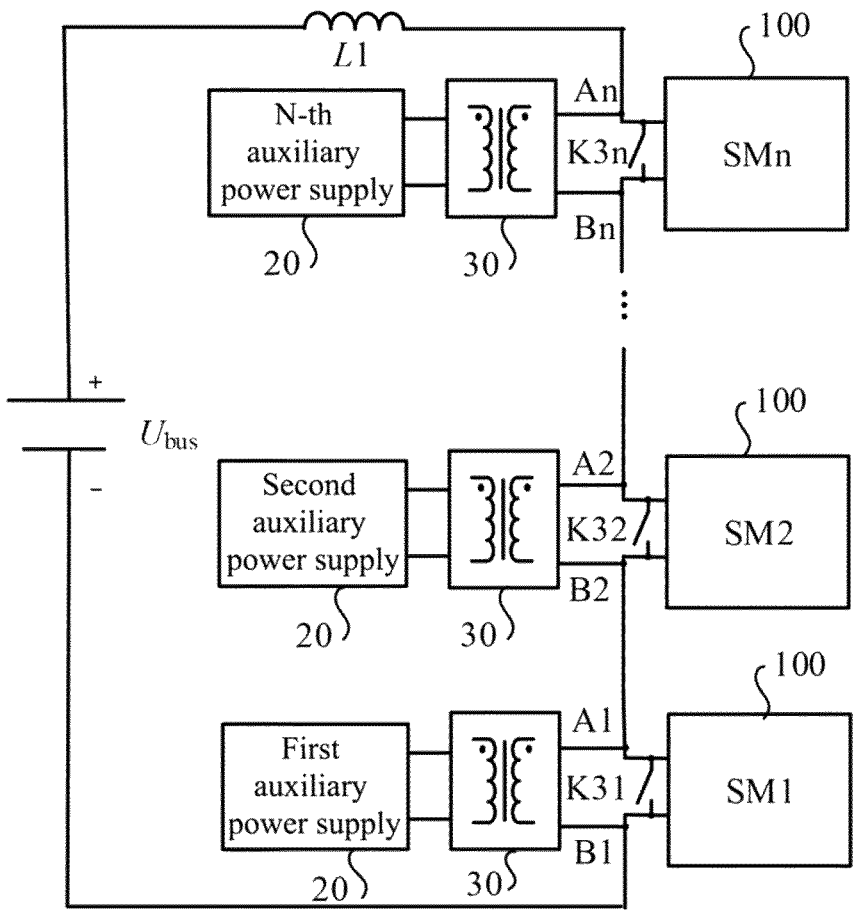
FIG. 1 is a schematic circuit diagram of another power conversion system.
Figure 2:
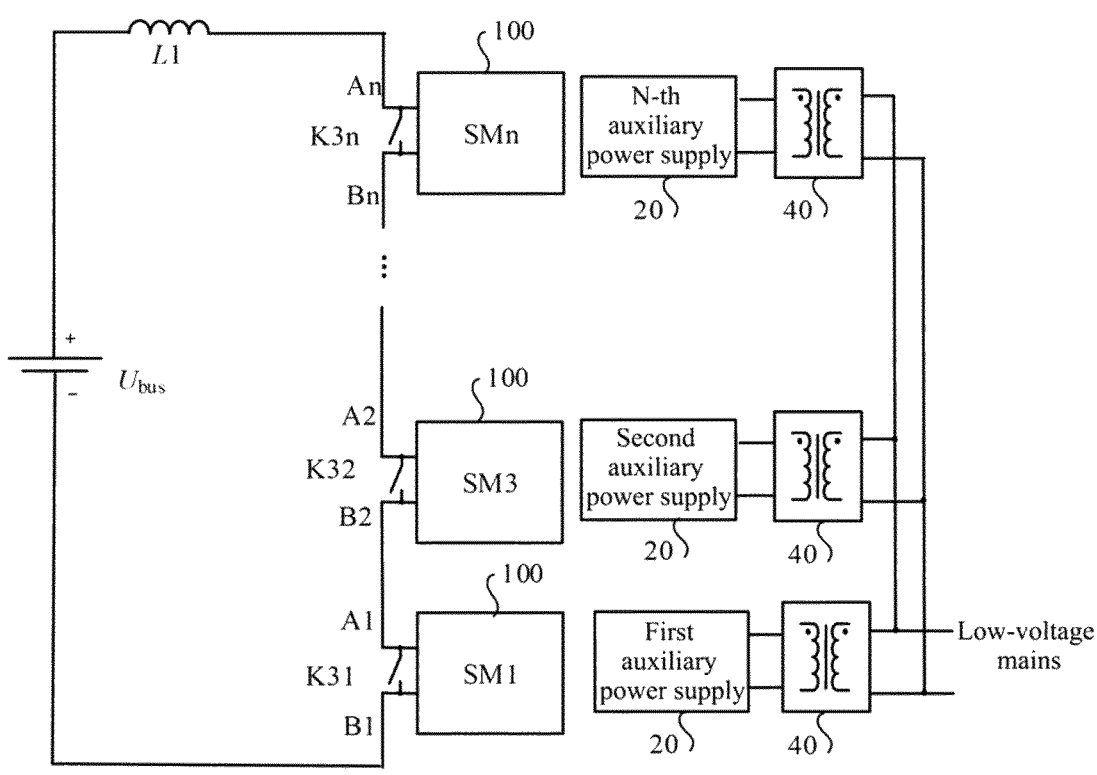
FIG. 2 is a schematic circuit diagram of yet another power conversion system.
Figure 3:
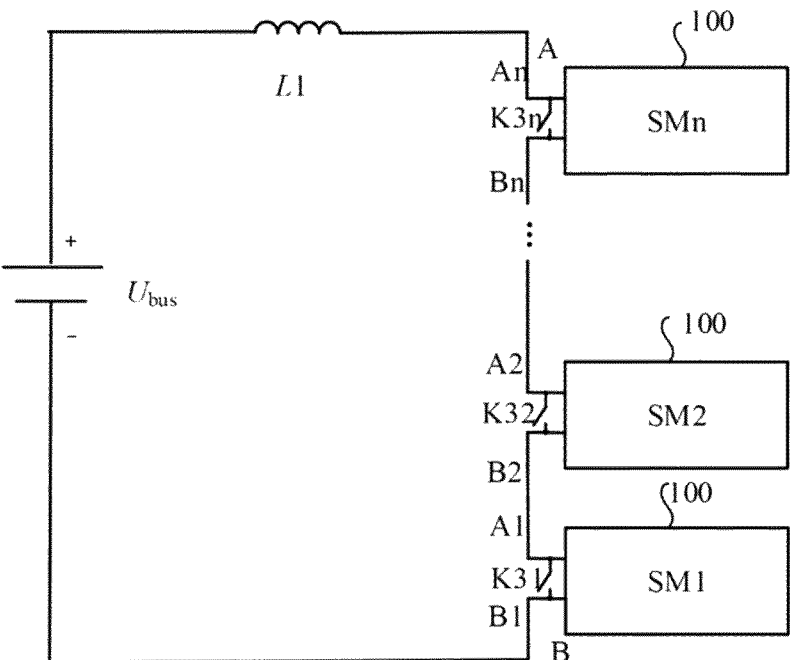
FIG. 3 is a schematic circuit diagram of a power conversion system.

FIG. 3 is a schematic diagram of a power conversion system. As shown in FIG. 3, the power conversion system includes a plurality of cascaded power modules 100, where each power module 100 includes at least a power unit 10, and each power unit 10 includes a first port. More specifically, N power modules 100 include a power module SM1, a power module SM2, a power module SM3, . . . a power module SMn, respectively. A first port of the power module SM1 includes a second end A1 and a first end B1, a first port of the power module SM2 includes a second end A2 and a first end B2, a first port of the power module SM3 includes a second end A3 and a first end B3, and analogically, a first port of the power module SMn includes a second end An and a first end Bn. The first end B1 of the first port of the power module SM1 acts as a first end B of a direct current port of the power conversion system. The second end A1 of the first port of the power module SM1 is connected to the first end B2 of the first port of the power module SM2, the second end A2 of the first port of the power module SM2 is connected to the first end B3 of the first port of the power module SM3, analogically, the first end Bn of the first port of the power module SMn is connected to the second end A(n−1) of the first port of the power module SM(n−1), and the second end An of the first port of the power module SMn acts as a second end A of a direct current port of the power conversion system. The direct current port of the power conversion system may be connected to a direct current bus Ubus by a first circuit breaker K1 and an inductor L1. For example, a first circuit breaker K1 and an inductor L1 are connected between the positive end of the direct current bus Ubus and the first port of the power module 100 at the last stage of cascaded power modules 100, and a second circuit breaker K2 is connected between the negative end of the direct current bus Ubus and the first port of the power module 100 at the first stage of cascaded power modules 100.

It should also be noted that, different power conversion circuits of the power units 10 in the plurality of power modules 100 of the power conversion system may be used as differently functioned modules, including but not limited to a low-frequency module using a half-bridge conversion circuit or a high-frequency module using a full-bridge conversion circuit. The high-frequency module may be used to control an input current of the power conversion system, and the first port of each power unit 10 for the low-frequency module serves as a charge and discharge port of a direct current voltage, where a plurality of power units 10 participating in the power conversion are cascaded to provide a voltage at the direct current bus Ubus. In order to ensure the reliability of the operation of the power conversion system, a plurality of redundant power modules 100 may also be provided to improve the reliability of the system. The power conversion system may also include a plurality of bypass switches, and each power module 100 is provided with a bypass switch correspondingly. For example, the power unit of the power module SM1 includes a bypass switch K31, the power unit of the power module SM2 includes a bypass switch K32, the power unit of the power module SM3 includes a bypass switch K33, analogically, the power unit of the power module SMn includes a bypass switch K3n. The bypass switch corresponding to each power module 100 may be used to bypass a power unit 10 when the power unit 10 of the module is faulted, so as to ensure the reliability of power drawing of the auxiliary power supply; alternatively, through a switch to a bypass switch, a corresponding power module 100 is withdrawn from operation and enters into redundancy, or is brought into operation from a redundant state.

Figure 4A:
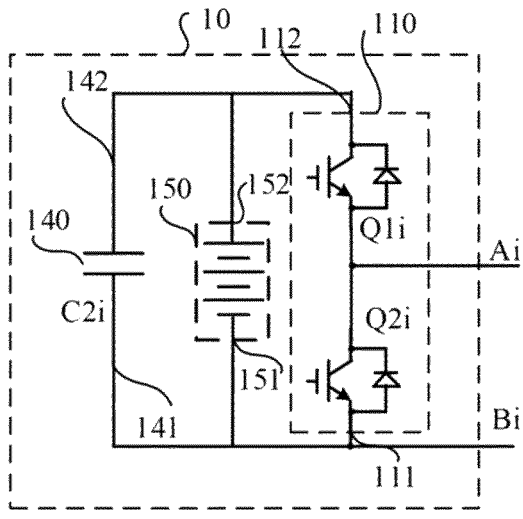
FIG. 4A, FIG. 4B and FIG. 4C are schematic circuit diagrams of a power unit of a power conversion system.
Figure 4B:
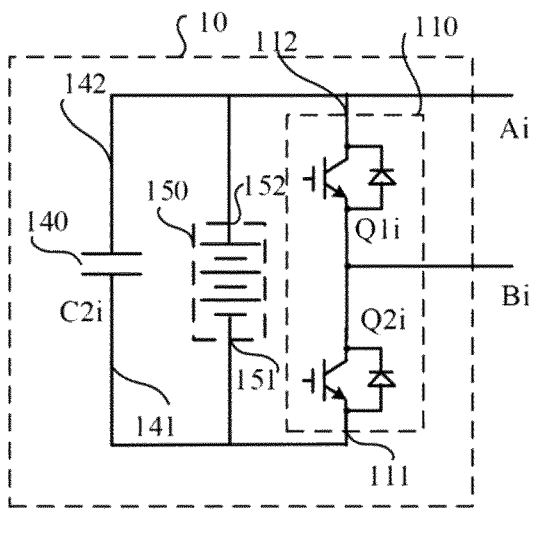
Figure 4C:
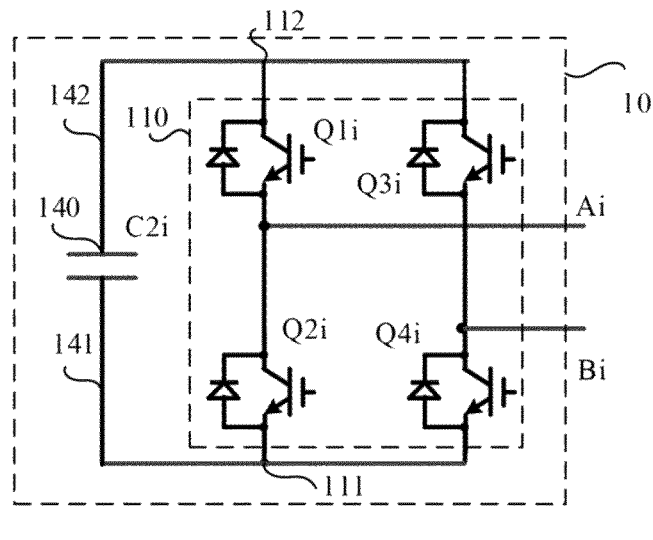

FIG. 4A, FIG. 4B and FIG. 4C each are schematic structural diagrams of a power unit 10. As shown in FIG. 4A, FIG. 4B and FIG. 4C, the power unit 10 includes a switching circuit 110 and a capacitor 140. The switching circuit 110 includes a first port and a second port, where the second port of the switching circuit 110 acts as a first port of the power unit 10. The first port of the switching circuit 110 includes a first end 111 and a second end 112, where the first end 111 of the first port of the switching circuit 110 is connected to a first end 141 of the capacitor 140, and the second end 112 of the first port of the switching circuit 110 is connected to a second end 142 of the capacitor 140.

As shown in FIG. 4A and FIG. 4B, the power unit 10 may further include an energy storage unit 150, the first end 111 of the first port of the switching circuit 110 is also connected to a first end 151 of the energy storage unit 150, the second end 112 of the first port of the switching circuit 110 is also connected to a second end 152 of the energy storage unit 150, the energy storage unit 150 is configured to store electric energy or release electric energy externally, and the energy storage unit 150 includes but is not limited to an energy storage battery or a supercapacitor.

In some embodiments, taking the power module SMi as an example for illustration, where 1≤i≤n, and i is a positive integer. As shown in FIG. 4A and FIG. 4B, the switching circuit 110 includes a first switching device Q1i and a second switching device Q2i connected in series, and a second end of the first switching device Q1i acts as the second end 112 of the first port of the switching circuit 110. A first end of the second switching device Q2i acts as the first end 111 of the first port of the switching circuit 110. In FIG. 4A, a connection point between the first end of the first switching device Q1i and a second end of the second switching device Q2i acts as a second end Ai of the second port of the switching circuit 110, and the first end of the second switching device Q2i acts as a first end Bi of the second port of the switching circuit 110. In FIG. 4B, the first end of the first switching device Q1i acts as a first end Ai of the second port of the switching circuit 110, and a connection point between the second end of the first switching device Q1i and the first end of the second switching device Q2i acts as a second end Bi of the second port of the switching circuit 110. A control end of the first switching device Q1i receives a first control signal, such as a driver signal, a control end of the second switching device Q2i receives a second control signal, such as a driver signal, and the first control signal controls the first switching device Q1i to turn on or turn off. The second control signal controls the second switching device Q2i to turn on or turn off. The switching devices include, but are not limited to, power devices such as IGBTs or MOSFETs.

In some embodiments, as shown in FIG. 4C, the switching circuit 110 includes a first switching device Q1i, a second switching device Q2i, a third switching device Q3i and a fourth switching device Q4i using a full-bridge connection. A connection point between the first end of the first switching device Q1i and the second end of the second switching device Q2i acts as a first end Ai of the second port of the switching circuit 110. A connection point between a first end of the third switching device Q3i and a second end of the fourth switching device Q4i acts as a second end Bi of the second port of the switching circuit 110. The second end of the first switching device Q1i is connected to a second end of the third switching device Q3i to act as the second end 112 of the first port of the switching circuit 110. A first end of the second switching device Q2i is connected to a first end of the fourth switching device Q4i to act as the first end 111 of the first port of the switching circuit 110.

A control end of the first switching device Q1i receives a first control signal, and the first control signal controls the first switching device Q1i to turn on or turn off; a control end of the second switching device Q2i receives a second control signal, and the second control signal controls the second switching device Q2i to turn on or turn off; a control end of the third switching device Q3i receives a third control signal, and the third control signal controls the third switching device Q3i to turn on or turn off; and a control end of the fourth switching device Q4i receives a fourth control signal, and the fourth control signal controls the fourth switching device Q4$i$ to turn on or turn off.

Some aspects of the embodiments of the present application relate to the above-described considerations. The scheme in the embodiments will be introduced hereunder in conjunction with some embodiments of the present application. As shown in FIG. 5 to FIG. 14, some embodiments of the present application provide a power conversion system including a plurality of power modules 100, where each power module 100 includes a capacitor 130, an auxiliary power supply unit 120 and a power unit 10. The auxiliary power supply unit 120 includes a first port (port 1), and the first port of the auxiliary power supply unit 120 is in a parallel connection with the capacitor 130. Specifically, a first end of the first port (port 1) of the auxiliary power supply unit 120 is connected to a first end 131 of the capacitor 130, and a second end of the first port (port 1) of the auxiliary power supply unit 120 is connected to a second end 132 of the capacitor 130. The capacitor 130 is configured to provide energy to the auxiliary power supply unit 120, so that an output of the auxiliary power supply unit 120 may supply power externally.

Each power unit 10 includes a first port, and first ports of respective power units 10 are cascaded successively. The way in which the first ports of the power units 10 are cascaded has been described in FIG. 3, and details will not be described here again. The structure of the power unit 10 may be, but not limited to, any structure in FIG. 4A, FIG. 4B or FIG. 4C. That is, the power unit 10 includes a switching circuit 110 and a capacitor 140. The switching circuit 110 includes a first port and a second port, and the second port of the switching circuit 110 acts as the first port of the power unit 10. The first port of the switching circuit 110 is in a parallel connection with the capacitor 140. More particularly, a first end of the first port of the switching circuit 110 is connected to a first end of the capacitor 140. A second end of the first port of the switching circuit 110 is connected to a second end of the capacitor 140. In some other embodiments, the first port of each power unit 10 may also have a bypass switch connected in parallel therewith, more specifically, the first port of the power unit of the power module SMi is in a parallel connection with a bypass switch K3$i$, where $1 \leq i \leq n$. The bypass switch is configured to bypass a power unit of the power module SMi when the power unit is faulted, or withdrawn from operation and enters into a redundant state.

The power conversion system further includes a plurality of first diodes 210, where each first diode 210 is connected to any two serially connected power modules 100. For ease of description, the power modules where any two serially connected power units 10 are located are referred to as a first module and a second module. For example, the first port of the power unit of the power module SM1 is in a series connection with the first port of the power unit of the power module SM2, and the power module SM1 is termed as the first module and the power module SM2 is termed as the second module.

The capacitor 130 of the first module is termed as a first capacitor, the auxiliary power supply unit 120 of the first module is termed as a first auxiliary power supply unit, the switching circuit 110 of the first module is termed as a first switching circuit, and the capacitor 140 of the first module is termed as a second capacitor. The capacitor 130 of the second module is termed as a third capacitor, the auxiliary power supply unit 120 of the second module is termed as a second auxiliary power supply unit, the switching circuit 110 of the second module is termed as a second switching circuit, and the capacitor 140 of the second module is termed as a fourth capacitor.

A first end of a second port of the first switching circuit is also connected to a first end of the first capacitor. A first end of a second port of the second switching circuit is also connected to a first end of the third capacitor. Two ends of the first diode 210 are connected to the first capacitor and the third capacitor, respectively. With such an arrangement, power transfer may be achieved between the first capacitor and the third capacitor. That is, energy may be transferred in one direction between power modules where two serially connected power units are located.

More specifically, for example, the power unit 10 of the power module SM1 and the power unit 10 of the power module SM2 are connected in series, the power module SM1 acts as the first module, the power module SM2 acts as the second module, and a capacitor C11 of the power module SM1 provides charge to a capacitor C12 of the power module SM2. The power unit 10 of the power module SM2 and the power unit 10 of the power module SM3 are connected in series, the power module SM2 acts as the first module, the power module SM3 acts as the second module, and a capacitor C12 of the power module SM2 provides charge to a capacitor C13 of the power module SM3. Analogically, the energy is transferred stage by stage until it is transferred to a capacitor C1$n$ of a power module SMn. In this way, the capacitor 130 of each power module 100 may be charged to supply power to the auxiliary power supply unit 120 of the power module 100.

In some embodiments, the power conversion system further includes a controller. The controller is configured to draw power from the auxiliary power supply unit, and control a corresponding switch of the first switching circuit of the first module to turn on, so that the first switching circuit outputs a zero voltage level, thereby forming an energy transfer loop to enable power transfer from the first capacitor of the first module to the third capacitor of the second module.

Embodiment 1

An example is taken with the structure of each power unit 10 of the power conversion system being the structure as shown in FIG. 4A, and description will be made hereunder to a process of power transfer from the capacitor 130 of the power module SM1 to the capacitor 130 of the power module SMn stage by stage.

Figure 5:
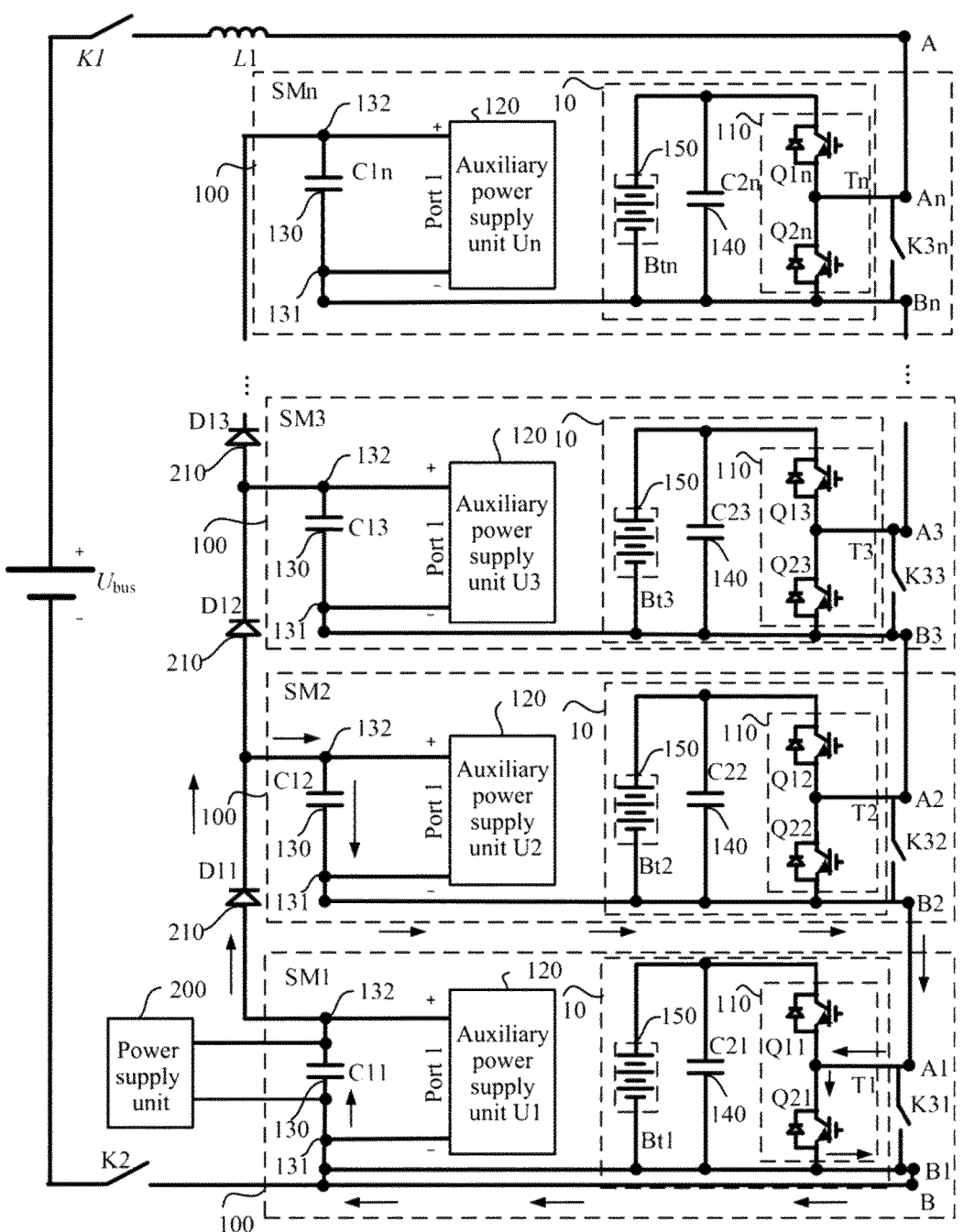
FIG. 5 to FIG. 8 are schematic circuit diagrams of a power conversion system according to the present application.

As shown in FIG. 5, for a series connection between the power unit 10 of the power module SM1 and the power unit 10 of the power module SM2, the second end 132 of the capacitor C11 of the power module SM1 is connected to the anode of the first diode D11, and the second end 132 of the capacitor C12 of the power module SM2 is connected to the cathode of the first diode D11. The first end B1 of the second port of the switching circuit T1 in the power module SM1 is connected to the first end 131 of the capacitor C11, and the first end B2 of the second port of the switching circuit T2 in the power module SM2 is connected to the first end 131 of the capacitor C12. The energy transfer loop between the capacitor C11 of the power module SM1 and the capacitor C12 of the power module SM2 is: from the second end 132 of the capacitor C11 of the power module SM1, passing through the first diode D11, the capacitor C12 of the power module SM2, the first end B2 of the second port of the switching circuit T2 in the power module SM2, the second switching device Q21 of the switching circuit T1 in the power module SM1 and the first end B1 of the second port of the switching circuit T1 in the power module SM1, and returning back to the first end 131 of the capacitor C11 of the power module SM1, so that an energy transfer loop is formed by controlling the second switching device Q21 of the switching circuit T1 in the power module SM1 to turn on, and outputting a zero voltage level by the power module SM1, thereby achieving that the capacitor C11 of the power module SM1 provides charge to the capacitor C12 of the power module SM2.

As shown in FIG. 5, for a series connection between the power unit 10 of the power module SM2 and the power unit 10 of the power module SM3, the second end 132 of the capacitor C12 of the power module SM2 is connected to the anode of the first diode D12, and the second end 132 of the capacitor C13 of the power module SM3 is connected to the cathode of the first diode D12. The first end B2 of the second port of the switching circuit T2 in the power module SM2 is connected to the first end 131 of the capacitor C12, and the first end B3 of the second port of the switching circuit T3 in the power module SM3 is connected to the first end 131 of the capacitor C13. The energy transfer loop (not shown in the figure) between the capacitor C12 of the power module SM2 and the capacitor C13 of the power module SM3 is: from the second end 132 of the capacitor C12 of the power module SM2, passing through the first diode D12, the capacitor C13 of the power module SM3, the first end B3 of the second port of the switching circuit T3 in the power module SM3, the second switching device Q22 of the switching circuit T2 in the power module SM2 and the first end B2 of the second port of the switching circuit T2 in the power module SM2, and returning back to the first end 131 of the capacitor C12 of the power module SM2, so that an energy transfer loop is formed by controlling the second switching device Q22 of the switching circuit T2 in the power module SM2 to turn on, and outputting a zero voltage level by the power module SM2, thereby achieving that the capacitor C12 of the power module SM2 provides charge to the capacitor C13 of the power module SM3.

By analogy, the capacitor C13 of the power module SM3 provides charge to the capacitor C14 of the power module SM4, until the capacitor $C1(n-1)$ of the power module $SM(n-1)$ provides charge to the capacitor $C1n$ of the power module SMn, so that the capacitor 130 of each power module 100 is fully charged, and each capacitor 130 supplies power to the auxiliary power supply unit 120 of the power module 100 where the capacitor 130 is located, and the auxiliary power supply unit 120 then supplies power to the controller and/or other circuits.

In the present embodiment, the controller sequentially controls the second switching device Q21 of the power module SM1 to turn on, the second switching device Q22 of the power module SM2 to turn on, . . . and the second switching device $Q2(n-1)$ of the power module $SM(n-1)$ to turn on, so as to ensure that the electric energy is transferred from the capacitor C11 of the power module SM1 to the capacitor $C1n$ of the power module SMn, sequentially. Through the alternate switching for a corresponding switching device of the power unit 10, one power unit 10 is bypassed when another power unit 10 is put into operation, so as to ensure that there occurs no voltage jump on the direct current bus Ubus connected to the power conversion system, and ensure the stability of the auxiliary power supply system of the power conversion system during establishment of a power supply voltage. At the same time, through using the capacitor 130 to supply power to the auxiliary power supply unit 120 rather than using the capacitor 140 of the power unit to supply power to the auxiliary power supply unit 120, it enables the path of power draw of the auxiliary power supply unit to be unconnected from the power module, thereby ensuring that when some power modules 100 are faulted during establishment of a power supply for the auxiliary power supply system of the power conversion system, the auxiliary power supply units may still be continuously powered to ensure the reliability of power draw of the auxiliary power supply system.

Embodiment 2

An example is taken with the structure of each power unit 10 of the power conversion system being the structure as shown in FIG. 4B, and description will be made hereunder to a process of power transfer from the capacitor 130 of the power module SMn to the capacitor 130 of the power module SM1 stage by stage.

Figure 6:
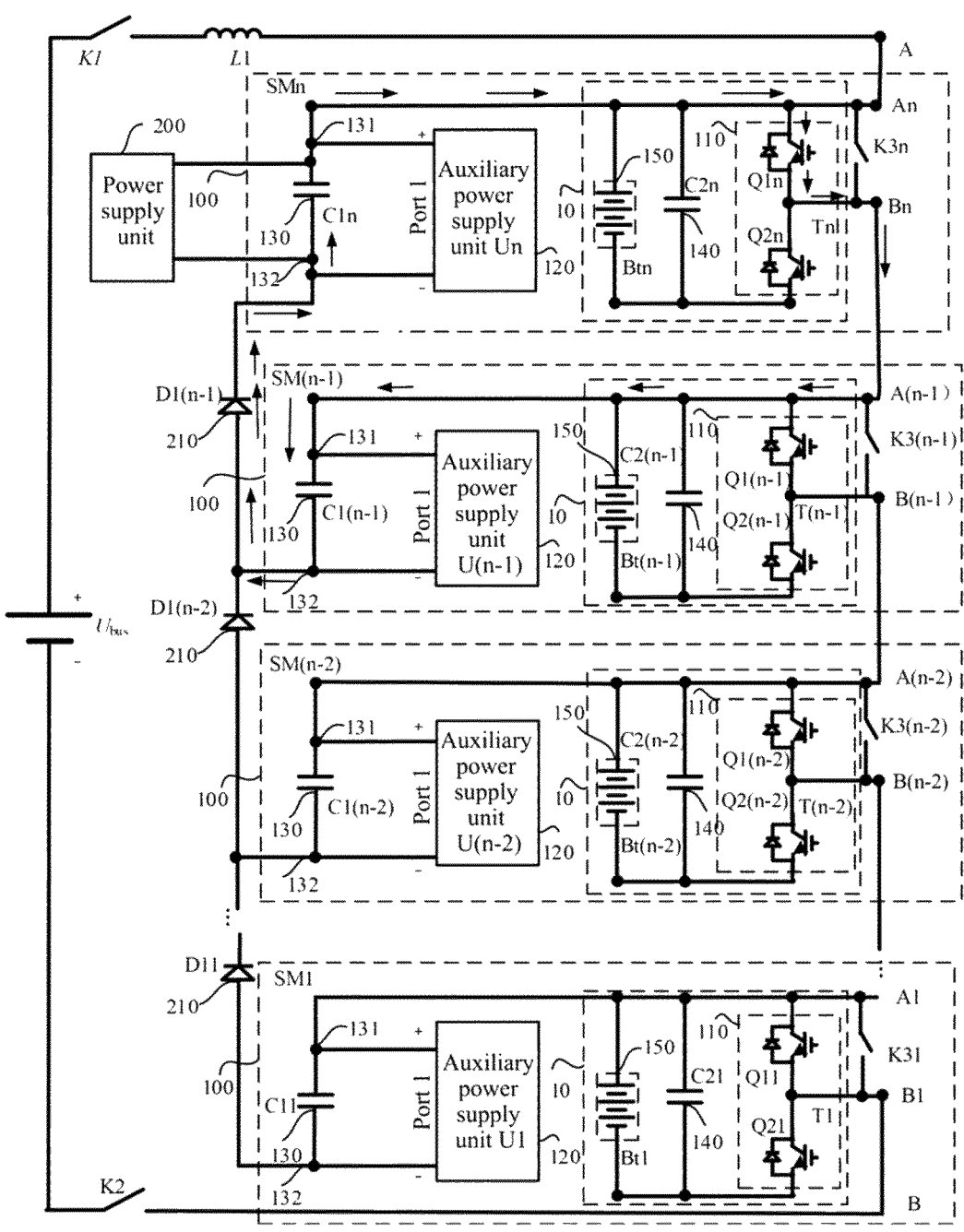

As shown in FIG. 6, for a series connection between the power unit 10 of the power module SMn and the power unit 10 of the power module $SM(n-1)$, the second end 132 of the capacitor $C1n$ of the power module SMn is connected to the cathode of the first diode $D1(n-1)$, and the second end 132 of the capacitor $C1(n-1)$ of the power module $SM(n-1)$ is connected to the anode of the first diode $D1(n-1)$. The first end An of the second port of the switching circuit Tn in the power module SMn is connected to the first end 131 of the capacitor $C1n$, and the first end $A(n-1)$ of the second port of the switching circuit $T(n-1)$ in the power module $SM(n-1)$ is connected to the first end 131 of the capacitor $C1(n-1)$. The energy transfer loop between the capacitor $C1n$ of the power module SMn and the capacitor $C1(n-1)$ of the power module $SM(n-1)$ is: from the first end 131 of the capacitor $C1n$ of the power module SMn, passing through the first end An of the second port of the switching circuit Tn in the power module SMn, the first switching device $Q1n$ of the switching circuit Tn in the power module SMn, the first end $A(n-1)$ of the second port of the switching circuit $T(n-1)$ in the power module $SM(n-1)$, the capacitor $C1(n-1)$ of the power module $SM(n-1)$ and the first diode $D1(n-1)$, and returning back to the second end 132 of the capacitor $C1n$ of the power module SMn, so that an energy transfer loop is formed by controlling the first switching device $Q1n$ of the switching circuit Tn in the power module SMn to turn on, and outputting a zero voltage level by the power module SMn, thereby achieving that the capacitor $C1n$ of the power module SMn provides charge to the capacitor $C1(n-1)$ of the power module $SM(n-1)$.

As shown in FIG. 6, for a series connection between the power unit 10 of the power module $SM(n-1)$ and the power unit 10 of the power module $SM(n-2)$, the second end 132 of the capacitor $C1(n-1)$ of the module $SM(n-1)$ is connected to the cathode of the first diode $D1(n-2)$, and the second end 132 of the capacitor $C1(n-2)$ of the module $SM(n-2)$ is connected to the anode of the first diode $D1(n-2)$. The first end $A(n-1)$ of the second port of the switching circuit $T(n-1)$ in the power module $SM(n-1)$ is connected to the first end 131 of the capacitor $C1(n-1)$, and the first end $A(n-2)$ of the second port of the switching circuit $T(n-2)$ in the power module $SM(n-2)$ is connected to the first end 131 of the capacitor $C1(n-2)$. The energy transfer loop (not shown in the figure) between the capacitor $C1(n-1)$ of the module $SM(n-1)$ and the capacitor $C1(n-2)$ of the module $SM(n-2)$ is: from the first end 131 of the capacitor $C1(n-1)$ of the module $SM(n-1)$, passing through the first end $A(n-1)$ of the second port of the switching circuit $T(n-1)$ in the module $SM(n-1)$, the first switching device $Q1(n-1)$ of the switching circuit T(n–1) in the module SM(n–1), the first end A(n–2) of the second port of the switching circuit T(n–2) in the module SM(n–2), the capacitor C1($n$–2) of the module SM(n–2) and the first diode D1($n$–2), and returning back to the second end 132 of the capacitor C1($n$–1) of the module SM(n–1), so that an energy transfer loop is formed by controlling the first switching device Q1($n$–1) of the switching circuit T(n–1) in the module SM(n–1) to turn on, and outputting a zero voltage level by the power module SM(n–1), thereby achieving that the capacitor C1($n$–1) of the module SM(n–1) provides charge to the capacitor C1($n$–2) of the power module SM(n–2).

By analogy, the capacitor C1($n$–2) of the power module SM(n–2) provides charge to the capacitor C1($n$–3) of the power module SM(n–3), until the capacitor C12 of the power module SM2 provides charge to the capacitor C11 of the power module SM1, so that the capacitor 130 of each power module 100 is fully charged, and each capacitor 130 supplies power to the auxiliary power supply unit 120 of the power module 100 where the capacitor 130 is located, and the auxiliary power supply unit 120 then supplies power to the controller or other circuits.

In the present embodiment, the controller sequentially controls the second switching device Q1$n$ of the power unit in power module SMn to turn on, the second switching device Q1($n$–1) of the power unit in power module SM(n–1) to turn on, . . . and the second switching device Q12 of the power unit in power module SM2 to turn on, so as to ensure that the electric energy is sequentially transferred from the capacitor C1$n$ of the power module SMn to the capacitor C11 of the power module SM1.

Embodiment 3

Different power conversion circuits may be used for power units 10 of a plurality of power modules 100 of the power conversion system. An example is taken with the structure of part of the power units 10 of the power conversion system being the structure as shown in FIG. 4A and the structure of rest of the power units 10 of the power conversion system being the structure as shown in FIG. 4C, and description will be made hereunder to a process of power transfer from the capacitor 130 of the power module SM1 to the capacitor 130 of the power module SMn stage by stage.

Figure 7:
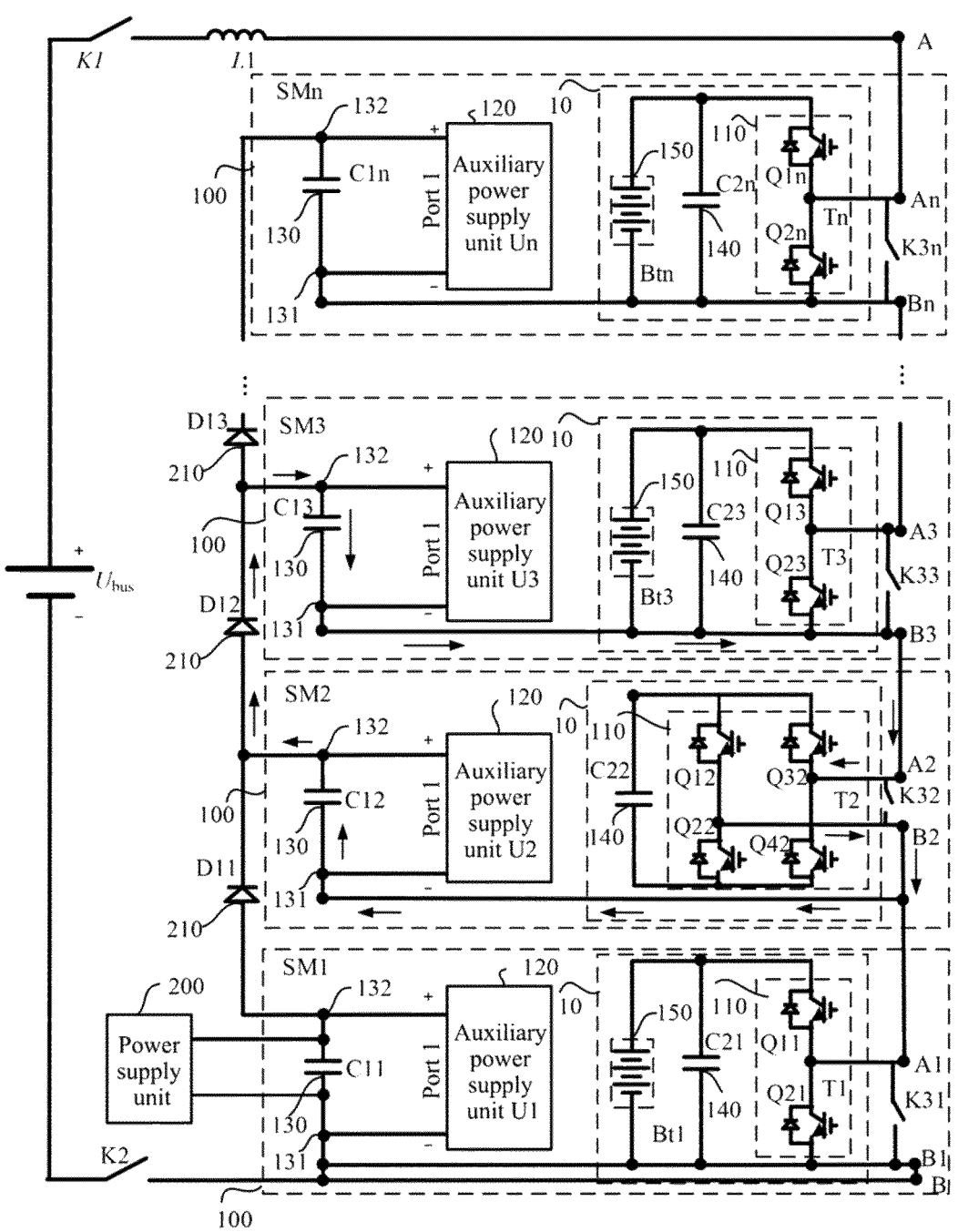

As shown in FIG. 7, the power module SM1, the power module SM3 to the power module SMn are of the structure shown in FIG. 4A. The power module SM2 is of the structure shown in FIG. 4C. The power transfer from the capacitor C11 of the power module SM1 to the capacitor C12 of the power module SM2 and then power transfer from the capacitor C13 of the power module SM3 until the capacitor C1$n$ of the power module SMn are the same as that in FIG. 5, and details will not be described here again.

For the power transfer between the capacitor C12 of the power module SM2 and the capacitor C13 of the power module SM3, specifically: the second end 132 of the capacitor C12 of the power module SM2 is connected to the anode of the first diode D12, and the second end 132 of the capacitor C13 of the power module SM3 is connected to the cathode of the first diode D12. The first end B2 of the second port of the switching circuit T2 in the power module SM2 is connected to the first end 131 of the capacitor C12, and the first end B3 of the second port of the switching circuit T3 in the power module SM3 is connected to the first end 131 of the capacitor C13. The energy transfer loop between the capacitor C12 of the power module SM2 and the capacitor C13 of the power module SM3 is: from the second end 132 of the capacitor C12 of the power module SM2, passing through the first diode D12, the capacitor C13 of the power module SM3, the first end B3 of the second port of the switching circuit T3 in the power module SM3, the first switching device Q12 and the third switching device Q32 of the switching circuit T2 in the power module SM2 and the first end B2 of the second port of the switching circuit T2 in the power module SM2, and returning back to the first end 131 of the capacitor C12 of the power module SM2, so that an energy transfer loop is formed by controlling the first switching device Q12 and the third switching device Q32 of the switching circuit T2 in the power module SM2 to turn on or the second switching device Q22 and the fourth switching device Q42 to turn on, and outputting a zero voltage level by the power module SM2, thereby achieving that the capacitor C12 of the power module SM2 provides charge to the capacitor C13 of the power module SM3.

Embodiment 4

An example is taken with the structure of part of the power modules 10 of the power conversion system being the structure as shown in FIG. 4B and the structure of rest of the power modules 10 of the power conversion system being the structure as shown in FIG. 4C, and description will be made hereunder to a process of power transfer from the capacitor 130 of the power module SMn to the capacitor 130 of the power module SM1 stage by stage.

Figure 8:
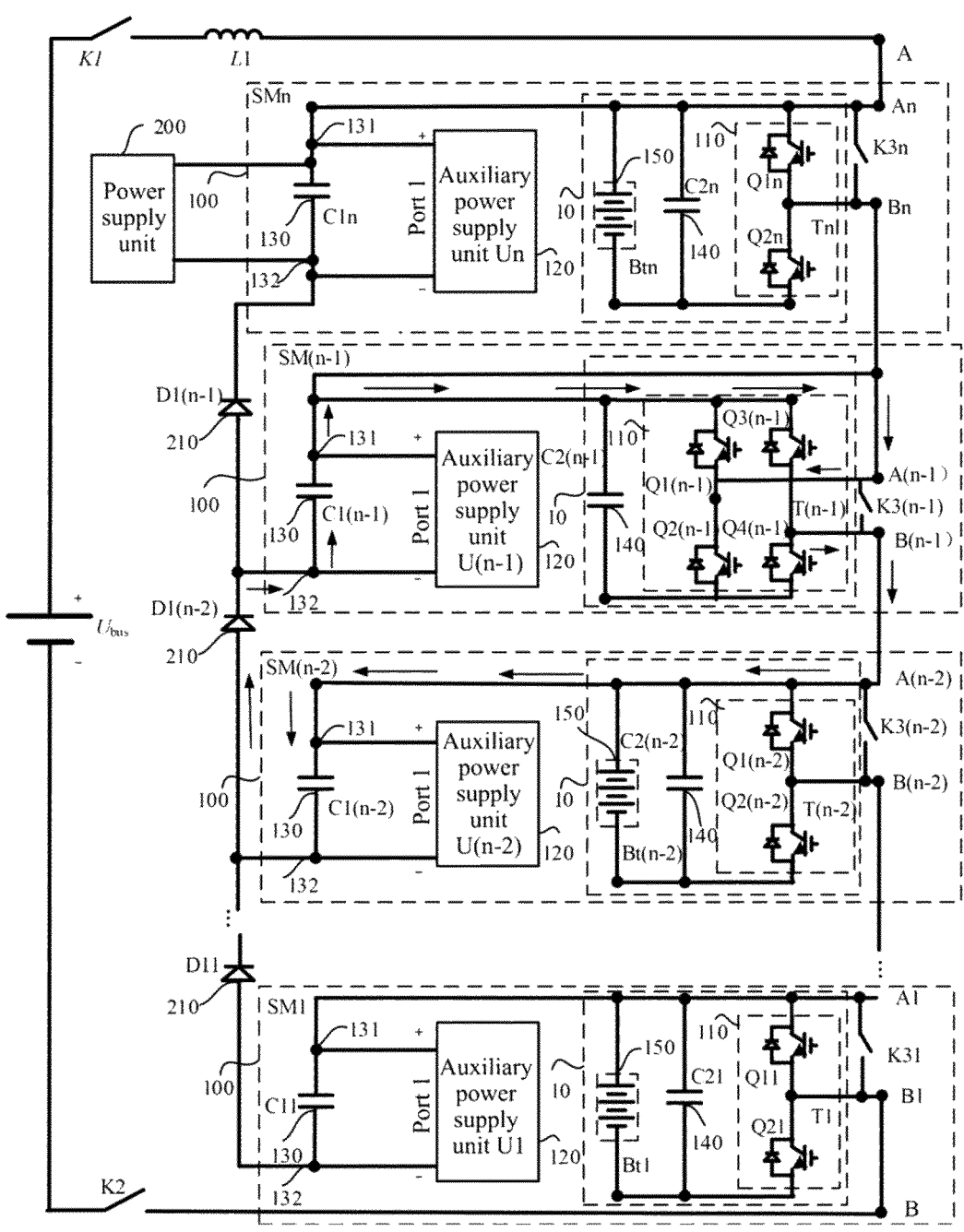

As shown in FIG. 8, the power module SMn, the power module SM(n–2) to the power module SM1 are of the structure shown in FIG. 4B. The power module SM(n–1) is of the structure shown in FIG. 4C. The power transfer from the capacitor C1$n$ of the power module SMn to the capacitor C1($n$–1) of the power module SM(n–1) and the power transfer from the capacitor C1($n$–2) of the power module SM(n–2) until the capacitor C11 of the power module SM1 are the same as that in FIG. 6, and details will not be described here again.

For the power transfer between the capacitor C1($n$–1) of the power module SM(n–1) and the capacitor C1($n$–2) of the power module SM(n–2), specifically: the second end of the capacitor C1($n$–1) of the power module SM(n–1) is connected to the cathode of the first diode D1($n$–2), and the second end of the capacitor C1($n$–2) of the power module SM(n–2) is connected to the anode of the first diode D1($n$–2). The second end A(n–1) of the second port of the switching circuit T(n–1) in the power module SM(n–1) is connected to the first end 131 of the capacitor C1($n$–1), and the second end A(n–2) of the second port of the switching circuit T(n–2) in the power module SM(n–2) is connected to the first end 131 of the capacitor C1($n$–2). The energy transfer loop between the capacitor C1($n$–1) of the power module SM(n–1) and the capacitor C1($n$–2) of the power module SM(n–2) is: from the first end 131 of the capacitor C1($n$–1) of the power module SM(n–1), passing through the second end A(n–1) of the second port of the switching circuit T(n–1) in the power module SM(n–1), the second switching device Q2($n$–1) and the fourth switching device Q4($n$–1) of the switching circuit T(n–1) in the power module SM(n–1), the second end A(n–2) of the second port of the switching circuit T(n–2) in the power module SM(n–2), the capacitor C1($n$–2) of the power module SM(n–2) and the first diode D1($n$–2), and returning back to the second end 132 of the capacitor C1($n$–1) of the power module SM(n–1), so that a first energy transfer loop is formed by controlling the first switching device Q1($n$–1) and the third switching device Q3 (n–1) of the switching circuit T(n–1) in the power module SM(n–1) to turn on or the second switching device Q2(n–1) and the fourth switching device Q4(n–1) to turn on, and outputting a zero voltage level by the power module SM(n–1), thereby achieving that the capacitor C1(n–1) of the power module SM(n–1) provides charge to the capacitor C1(n–2) of the power module SM(n–2).

In the above-described technical solution, the power conversion system includes a first module, a second module and a first diode; the first module includes a first switching circuit, a first auxiliary power supply unit, a first capacitor and a second capacitor, where a first port of the first switching circuit is in a parallel connection with the second capacitor, a first port of the first auxiliary power supply unit is in a parallel connection with the first capacitor, the first capacitor is configured to provide charge to the first auxiliary power supply unit. The second module includes a second switching circuit, a second auxiliary power supply unit, a third capacitor and a fourth capacitor, where a first port of the second switching circuit is in a parallel connection with the fourth capacitor, a first port of the second auxiliary power supply unit is in a parallel connection with the third capacitor, the third capacitor is configured to provide charge to the second auxiliary power supply unit. A first end of the first capacitor is connected to a first end of a second port of the first switching circuit, and a first end of the third capacitor is connected to a first end of a second port of the second switching circuit, and the second port of the first switching circuit of the first module is in a series connection with the second port of the second switching circuit of the second module, and two ends of the first diode are connected to the first capacitor and the third capacitor, respectively. With such an arrangement, an energy transfer loop of the first capacitor and the third capacitor is formed between the first module and the second module, and after the first capacitor is charged, the first capacitor may provide charge to the third capacitor through the energy transfer loop. It should be noted that the path of the energy transfer loop is not limited to the foregoing embodiments, depending on different switching circuits employed in the power units 10, different switching devices in the switching circuits may be turned on or turned off to form an energy loop between the first capacitor of the first module and the third capacitance of the second module.

In addition, it should be noted that, during an energy transfer process, even if a certain power unit 10 and is bypassed because of a fault, or is withdrawn from operation and enters into a redundant state, it may still be guaranteed that the electric energy would be transferred in the capacitor 130 of each power module 100. Taking the power conversion system shown in FIG. 5 as an example, if the power module SM2 is faulted, for example, either one of the first switching device Q12 and the second switching device Q22 of the power module SM2 is faulted, the power module SM2 will be in a bypass state by closing the bypass switch K32.

Figure 9:
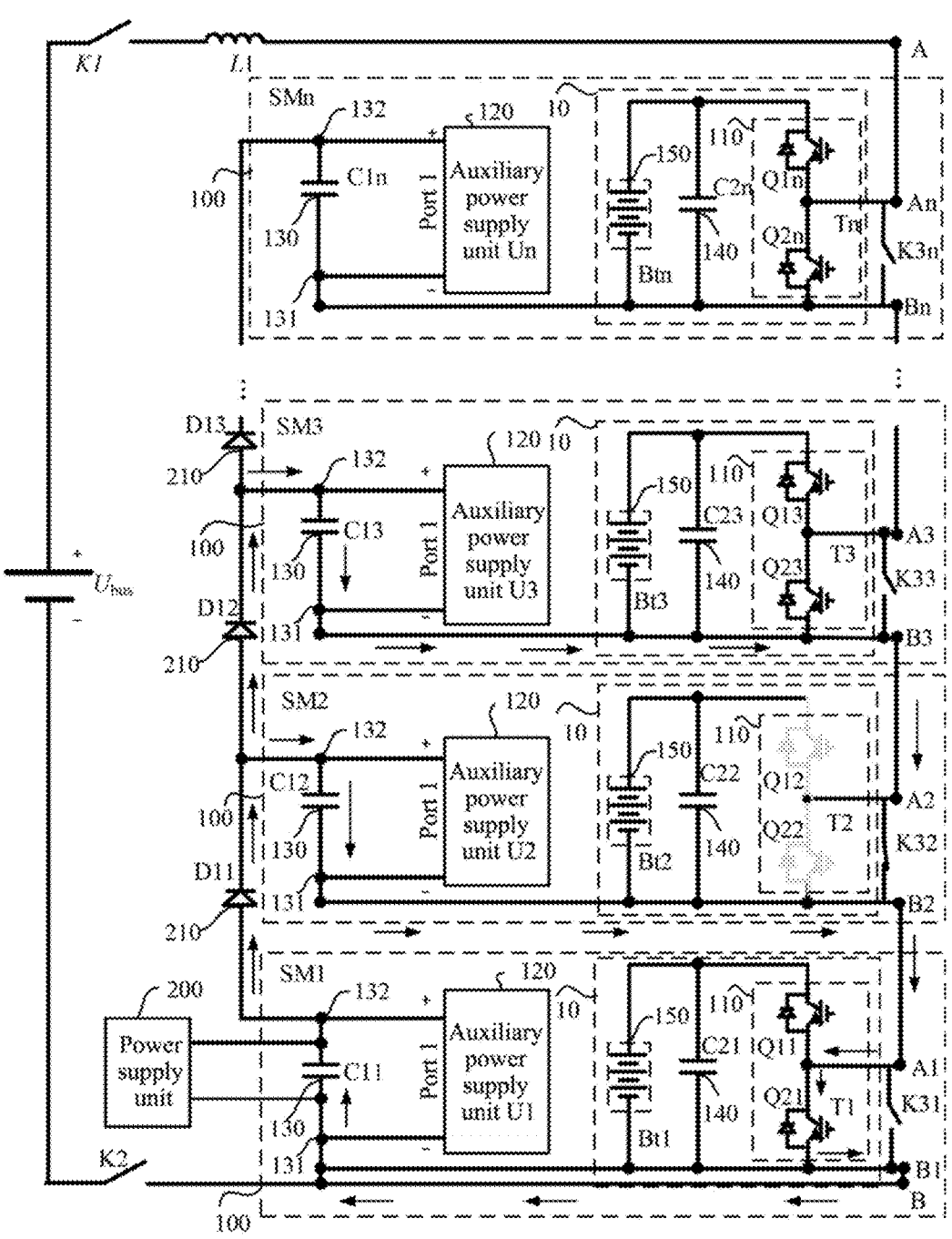
FIG. 9 and FIG. 10 each are schematic diagrams of energy transfer when a failure occurs in a power conversion system according to an embodiment of the present application.
Figure 10:
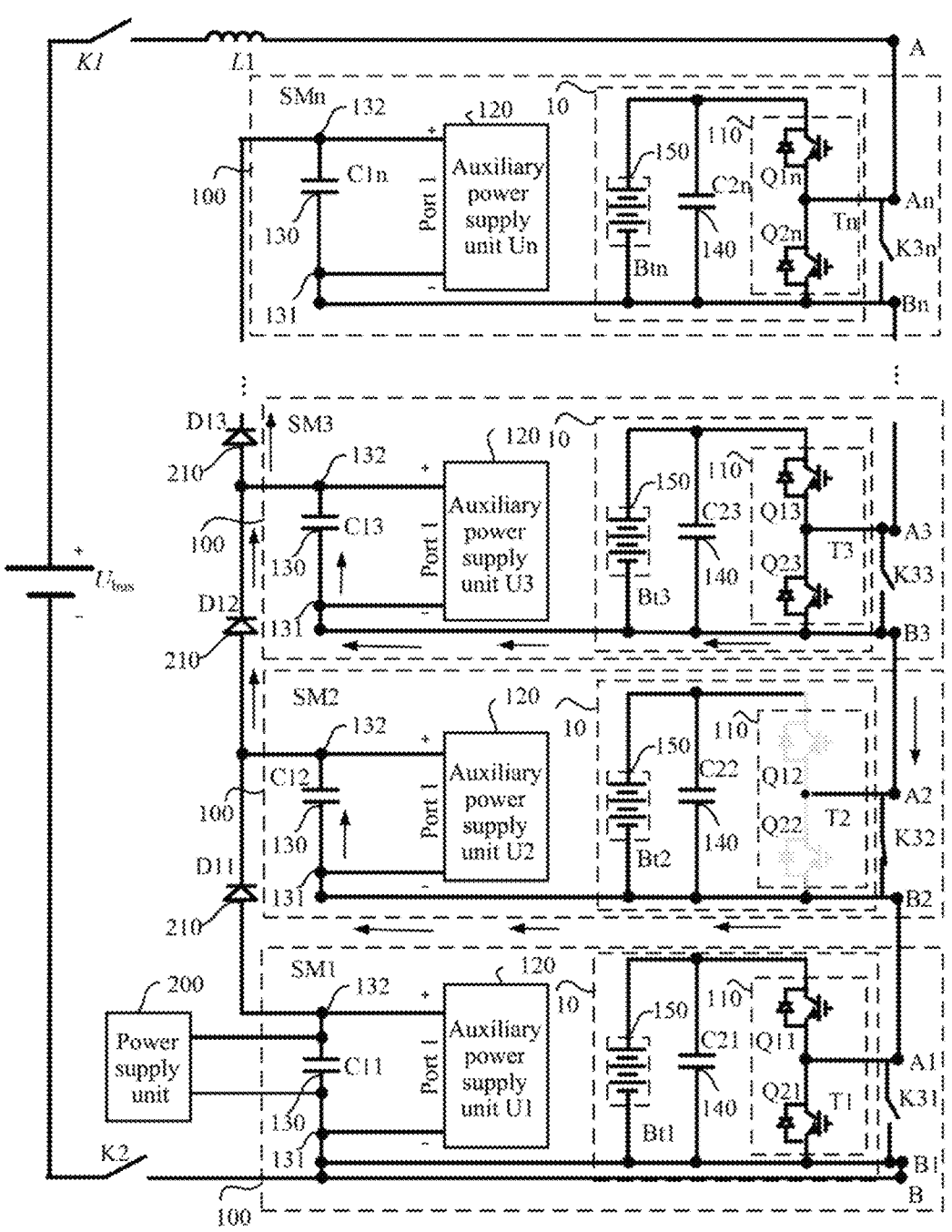

The power transfer process between the capacitor C11 of the power module SM1 and the capacitor C1n of the power module SMn is shown in FIG. 9 and FIG. 10.

As shown in FIG. 9, the second switching device Q21 of the power module SM1 is controlled to turn on, so that the capacitor C11 of the power module SM1 transfers electric energy to the capacitor C12 of the power module SM2 through a first energy transfer loop, and the capacitor C11 of the power module SM1 transfers electric energy to the capacitor C13 of the power module SM3 through a second energy transfer loop. At the same time, the capacitor C12 of the power module SM2 transfers electric energy to the capacitor C13 of the power module SM3 through a third energy transfer loop.

The first energy transfer loop is: from the second end 132 of the capacitor C11 of the power module SM1, passing through the first diode D11, the capacitor C12, the first end B2 of the second port of the switching circuit T2 in the power module SM2, the second switching device Q21 of the switching circuit T1 in the power module SM1 and the first end B1 of the second port of the switching circuit T1 in the power module SM1, and returning back to the first end of the capacitor C11, thereby achieving that the capacitor C11 of the power module SM1 provides charge to the capacitor C12 of the power module SM2.

The second energy transfer loop is: from the second end 132 of the capacitor C11 of the power module SM1, passing through the first diode D11, the first diode D12, the capacitor C13 of the power module SM3, the first end B3 of the second port of the switching circuit T3 in the power module SM3, the bypass switch K32 and the second switching device Q21 of the switching circuit T1 in the power module SM1, and returning back to the first end 131 of the capacitor C11, thereby achieving that the capacitor C11 provides charge to the capacitor C13.

The third energy transfer loop (not shown in the figure) is: also from the second end 132 of the capacitor C12 of the power module SM2, passing through the first diode D12, the capacitor C13 of the power module SM3, the first end B3 of the second port of the switching circuit T3 in the power module SM3 and the bypass switch K32, and returning back to the first end of the capacitor C12, thereby achieving that the capacitor C12 provides charge to the capacitor C13.

As shown in FIG. 10, the second switching device Q23 of the power module SM3 is controlled to turn on, so that the capacitor C12 of the power module SM2 transfers electric energy to the capacitor C14 of the power module SM4 through the fourth energy transfer loop, and the capacitor C13 of the power module SM3 transfers electric energy to the capacitor C14 of the power module SM4 through the fifth transfer path.

The fourth energy transfer loop is: from the second end 132 of the capacitor C12 of the power module SM2, passing through the first diode D12, the first diode D13, the capacitor C14 of the power module SM4, the first end B4 of the second port of the switching circuit T4 in the power module SM4, the second switching device Q23 of the switching circuit T3 in the power module SM3, the first end B3 of the second port of the switching circuit T3 in the power module SM3, the bypass switch K32 and the second end B2 of the second port of the switching circuit T2 in the power module SM2, and returning back to the first end of the capacitor C12, thereby achieving that the capacitor C12 of the power module SM2 provides charge to the capacitor C14 of the power module SM4.

The fifth energy transfer loop is: from the second end 132 of the capacitor C13 of the power module SM3, passing through the first diode D13, the capacitor C14 of the power module SM4, the first end B4 of the second port of the switching circuit T4 in the power module SM4, the second switching device Q23 of the switching circuit T3 in the power module SM3, the first end B3 of the second port of the switching circuit T3 in the power module SM3, and returning back to the first end 131 of the capacitor C13, thereby achieving that the capacitor C13 of the power module SM3 provides charge to the capacitor C14 of the power module SM4.

The power transfer between the capacitor C14 and the capacitor C1$n$ is the same as that in FIG. 5, and details will not be described here again.

Similar to the principles of power transfer between the capacitor 130 of power modules after occurrence of a power module failure during establishment of a power supply for the auxiliary power supply system of the power conversion system, after the establishment of the power supply for the auxiliary power supply system is ended, the power conversion system enters into a normal operation state, and if SM2 is withdrawn from operation through the bypass switch K32 and enters a redundant state during the normal operation, the power unit of the power module SM1 and the power unit of the power module SM3 are cascaded, and the capacitor C12 of the power module SM2 may still be continuously charged.

Embodiment 5

Before the overall power supply is established for the auxiliary power supply system, the capacitance 130 of each power module is not charged, and in order to establish a circuit for the auxiliary power supply system, the power conversion system may also include a power supply unit 200.

As shown in FIG. 5 and FIG. 7, in Embodiment 1 and Embodiment 3, the power supply unit 200 is connected to the capacitor C11 of the power module SM1, and the power supply unit 200 is configured to provide charge to the capacitor C11. The capacitor C11 of the power module SM1 provides charge to C12 of the power module SM2, the capacitor C12 of the power module SM2 provides charge to C13 of the power module SM3, and analogically. Therefore, it is achieved that the energy is transferred from the capacitor C11 of the power module SM1 to the capacitor C1$n$ of the power module SMn.

As shown in FIG. 6 and FIG. 8, in Embodiment 2 and Embodiment 4, the power supply unit 200 is connected to the capacitor C1$n$ of the power module SMn, and the power supply unit 200 is configured to provide charge to the capacitor C1$n$. The capacitor C1$n$ of the power module SMn provides charge to C1$(n-1)$ of the power module SM(n-1), the capacitor C1$(n-1)$ of the power module SM(n-1) provides charge to C1$(n-2)$ of the power module SM(n-2), and analogically. Therefore, it is achieved that the energy is transferred from the capacitor C1$n$ of the power module SMn to the capacitor C11 of the power module SM1.

Embodiment 6

The power conversion system further includes a plurality of power supply units 200, where each power supply unit 200 is connected to a capacitor 130 of a power module 100, and each power supply unit 200 corresponds to a different power module 100.

Figure 11:
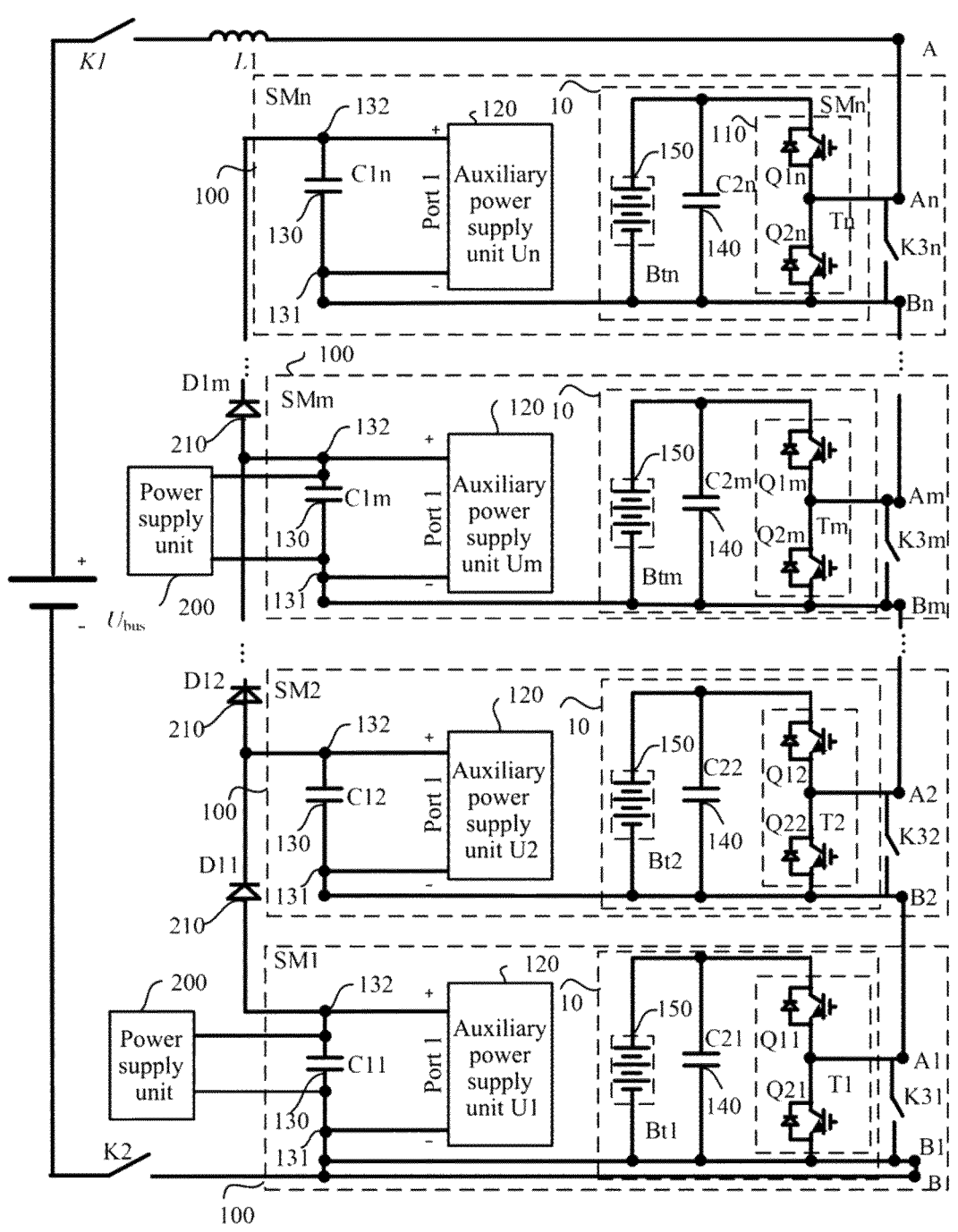
FIG. 11 to FIG. 14 are schematic circuit diagrams of a power conversion system according to the present application.

As shown in FIG. 11, the power conversion system of FIG. 11 differs from the power conversion system of FIG. 5 in that it includes two power supply units 200. A first power supply unit 200 is connected to C11 of the power module SM1, the first power supply unit 200 provides charge to the capacitor C11 of the power module SM1, the capacitor C11 of the power module SM1 provides charge to the capacitor C12 of the power module SM2 through an energy transfer loop, the capacitor C12 of the power module SM2 provides charge to the capacitor C13 of the power module SM3 through an energy transfer loop and, analogically, the capacitor C1$(n-1)$ of the power module SM(n-1) provides charge to the capacitor C1$n$ of the power module SMn through an energy transfer loop.

The second power supply unit 200 provides charge to the capacitor C1$m$ of the power module SMm, the capacitor C1$m$ of the power module SMm provides charge to the capacitor C1$(m+1)$ of the power module SM(m+1) through an energy transfer loop and, analogically, the capacitor (n−1) of the power module SM(n−1) provides charge to the capacitor C1$n$ of the power module SMn through an energy transfer loop.

That is, the first power supply unit 200 provides electrical power to the capacitor C11 of the power module SM1 and cascade transfer to the capacitor C1$n$ of the power module SMn. The second power supply unit 200 provides electrical power to the capacitor C1$m$ of the power module SMm and cascade transfer to the capacitor C1$n$ of the power module SMn. With such an arrangement, the process of energy transfer between the capacitors 130 of power modules 100 may be accelerated.

In the present embodiment, when the power conversion system has a plurality of power supply units 200, the switching devices of the switching circuits 110 of corresponding power modules 100 connected to the power supply units 200 may be controlled to turn on simultaneously, so that the switching circuits 110 in the power modules 100 output a zero voltage level, allowing simultaneous energy transfer from the plurality of power supply units 200, thereby accelerating the energy transfer rate. More specifically, when the power conversion system includes two power supply units 200, a controller may control the switching circuits 110 of the corresponding two power modules to simultaneously output a zero voltage level, for example, firstly control the second switching device Q21 of the switching circuit T1 in the power module SM1 and the second switching device Q2$m$ of the switching circuit Tm in the power module SMm to turn on; and then, control the second switching device Q22 of the switching circuit T2 in the power module SM2 and the second switching device Q2$(m+1)$ of the switching circuit T(m+1) in the power module SM(m+1) to turn on, and analogically.

Therefore, by means of configuring at least one power supply unit 200 to provide charge to the first capacitor of the first module and/or the third capacitor of the second module, initial energy is provided for establishment of a power source for an auxiliary power supply system, thereby achieving that a single power supply supplies power to loads with different voltage potentials to the ground. In the power conversion system of at least two cascaded power modules, by adding the first diode, the first capacitor, the third capacitor to form an energy transfer loop with the power switch(es) in corresponding switching circuit in the power unit, the first capacitor and the third capacitor supply power to the auxiliary power supply units of the first module and the second module, respectively, there is no need to provide individual power supply, such as gird frequency transformer, to each auxiliary power supply unit in corresponding power module 100, thereby reducing the size of the power module(s) and facilitating a power modularization of the power conversion system, Moreover, the charging circuit(s) for auxiliary power supply unit(s) is (are) constructed through the switching circuit(s) in the power unit(s) of the power module(s), which simplifies the circuit structure of each power module, thereby reducing the manufacturing cost of the power module(s). Since the capacitor of the auxiliary power supply unit for power supply is separated from the capacitor of the power unit 10, the auxiliary power supply unit 120 in each power module 100 may still be continuously supplied under the circumstance of a power unit 10 fault, thereby ensuring the reliability of auxiliary power supply system.

Embodiment 7

The power conversion system may also include a plurality of second diodes 220, where each second diode 220 is connected to power modules where any two cascaded power units are located. The power modules where any two power units 10 connected in series are located are termed as a first module and a second module. The capacitor 130 of the first module is termed as a first capacitor, the auxiliary power supply unit 120 of the first module is termed as a first auxiliary power supply unit, the switching circuit 110 in the first module is termed as a first switching circuit, and the capacitor 140 of the first module is termed as a second capacitor. The capacitor 130 of the second module is termed as a third capacitor, the auxiliary power supply unit 120 of the second module is termed as a second auxiliary power supply unit, the switching circuit 110 in the second module is termed as a second switching circuit, and the capacitor 140 of the second module is termed as a fourth capacitor.

One end of the second diode 220 is connected to the first capacitor and the other end of the second diode 220 is connected to the third capacitor, so that the first capacitor, the second diode 220 and the third capacitor are connected in series successively to form a first branch, and two ends of the first branch are electrically connected to positive and negative ends of a direct current bus Ubus, respectively, so that the direct current bus Ubus may provide charge to the first capacitor and the third capacitor through the first branch.

Figure 12:
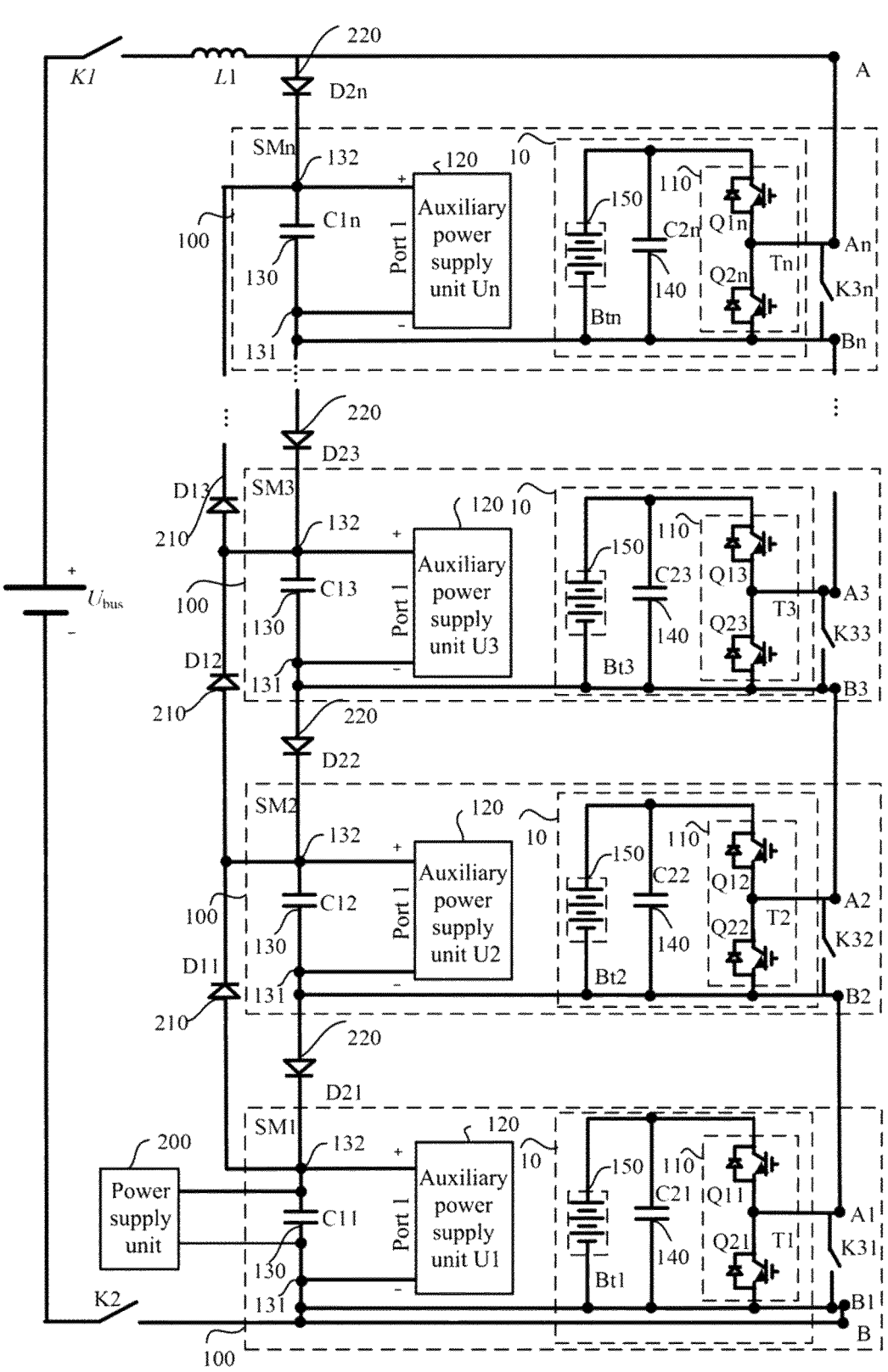

The power conversion system of FIG. 12 differs from the power conversion system of FIG. 5 in that a plurality of second diodes 220 is added between two power modules 100 of the power conversion system shown in FIG. 5. Specifically, in order to ensure connection of the first branch to the positive end of the direct current bus Ubus, a second diode 220 is added between the second end A of the direct current port of the power conversion system and the power module SMn.

The first end 131 of the capacitor C11 of the power module SM1 is connected to the second end B of the direct current port of the power conversion system, the second end 132 of the capacitor C11 of the power module SM1 is connected to the cathode of the second diode D21, and the first end 131 of the capacitor C12 of the power module SM2 is connected to the anode of the second diode D21. The second end 132 of the capacitor C12 of the power module SM2 is connected to the cathode of the second diode D22, and the first end 131 of the capacitor C13 of the power module SM3 is connected to the anode of the second diode D22. By analogy, the second end 132 of the capacitor C(n–1) of the power module SM(n–1) is connected to the cathode of the second diode D2(n–1), and the first end 131 of the capacitor Cn of the power module SMn is connected to the anode of the second diode D2(n–1). The second end 132 of the capacitor C1n of the power module SMn is connected to the cathode of the second diode D2n, and the second end A of the direct current port of the power conversion system is connected to the anode of the second diode D2n. With such an arrangement, a first branch is formed by the second diode D2n, the capacitor C1n, the second diode D2(n–1), the capacitor C1(n–1), . . . , the second diode D23, the capacitor C13, the second diode D22, the capacitor C12, the second diode D21 and the capacitor C11. When a circuit breaker, which is disposed between the direct current port of the direct current conversion system and the positive and negative ends of the direct current bus Ubus, is closed, the direct current bus Ubus may provide charge to the capacitor 130 of each power module 100 through the first branch.

Embodiment 8

Figure 13:
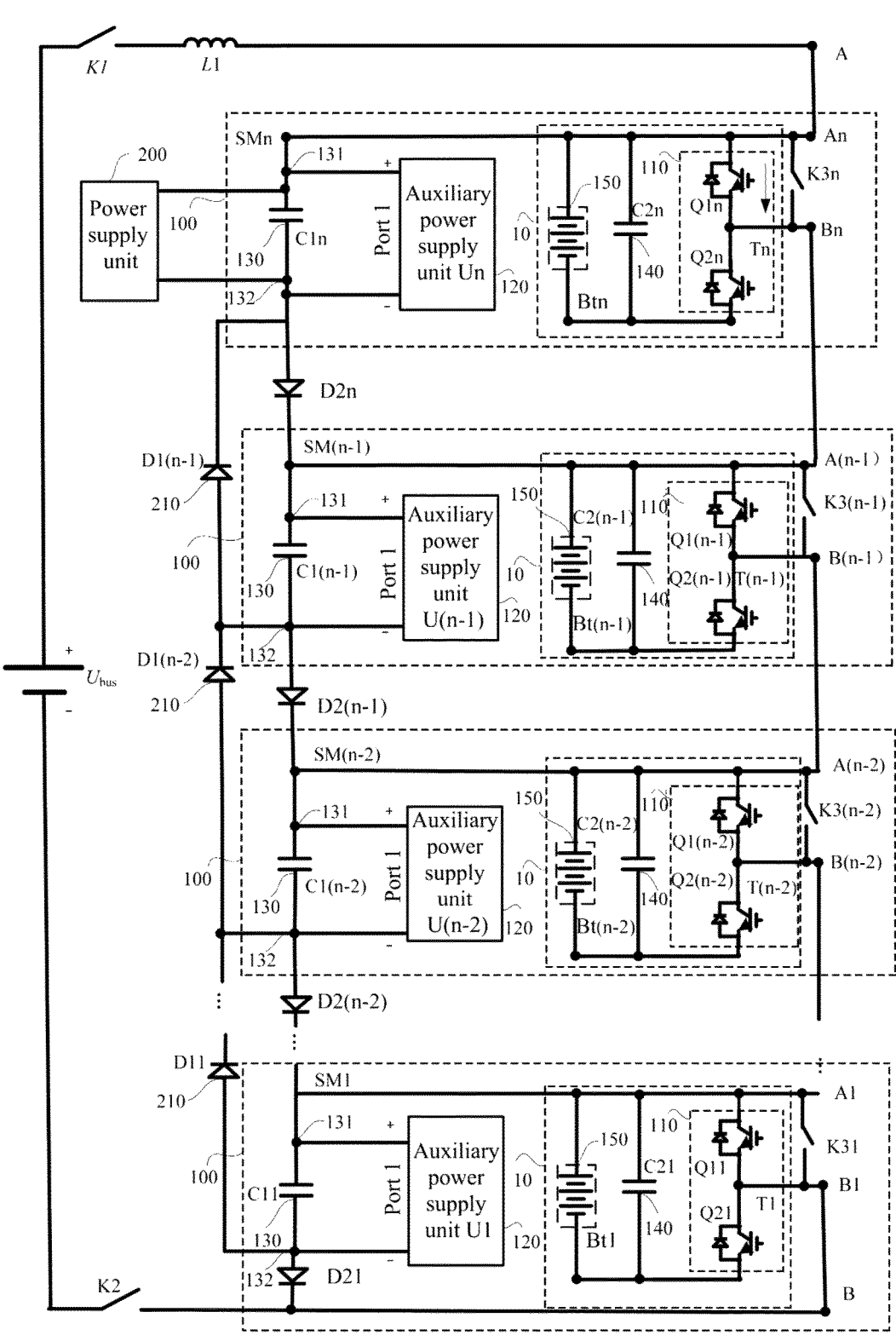

The power conversion system of FIG. 13 differs from the power conversion system of FIG. 6 in that a plurality of second diodes 220 is added between two power modules 100 of the power conversion system shown in FIG. 6. Specifically, in order to ensure connecting of the first branch to the negative end of the direct current bus Ubus, a second diode 220 is added between the first end B of the direct current port of the power conversion system and the power module SM1.

The first end 131 of the capacitor C1n of the power module SMn is connected to the second end A of the direct current port of the power conversion system, the second end 132 of the capacitor C1n of the power module SMn is connected to the anode of the second diode D2n, and the first end 131 of the capacitor C1(n–1) of the power module SM(n–1) is connected to the cathode of the second diode D2n. The second end 132 of the capacitor C1(n–1) of the power module SM(n–1) is connected to the anode of the second diode D2(n–1), and the first end 131 of the capacitor C1(n–2) of the power module SM(n–2) is connected to the cathode of the second diode D2(n–1). By analogy, the second end 132 of the capacitor C12 of the power module SM2 is connected to the anode of the second diode D22, and the first end 131 of the capacitor C11 of the power module SM1 is connected to the cathode of the second diode D22. The second end 132 of the capacitor C11 of the power module SM1 is connected to the anode of the second diode D21, and the first end B of the direct current port of the power conversion system is connected to the cathode of the second diode D21. With such an arrangement, a first branch is formed by the capacitor C1n, the second diode D2n, the capacitor C1(n–1), the second diode D2(n–1), . . . , the capacitor C13, the second diode D23, the capacitor C12, the second diode D22, the capacitor C11 and the second diode D21. When a circuit breaker, which is disposed between the direct current port of the direct current conversion system and the positive and negative ends of the direct current bus Ubus, is closed, the direct current bus Ubus may provide charge to the capacitor 130 of each power module 100 through the first branch.

In the above-described embodiments, a first branch is formed by the second diodes 220 and the capacitors 130, once the power conversion system is connected to the direct current bus, the capacitors 130 of the operating power modules are charged by the direct current bus. In case of a scenario that a power conversion system has a heavy load, the charging rate of the capacitors 130 may be increased on the basis of charging the capacitors 130 by energy transfer loops formed by the first diodes, and a voltage balance may be guaranteed for each charged capacitor 130.

Embodiment 9

Figure 14:
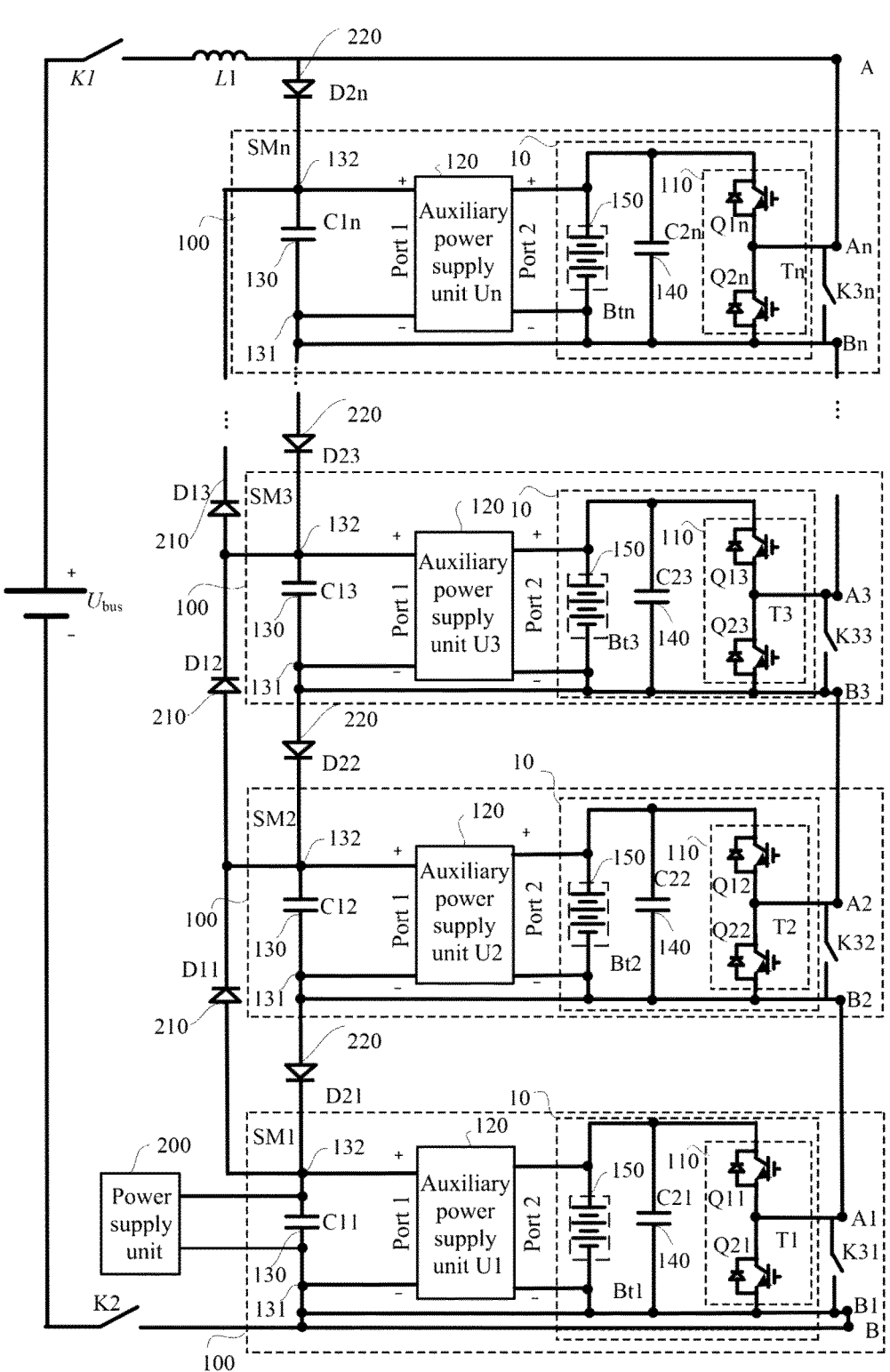

The power conversion system of FIG. 14 differs from the power conversion system of FIG. 12 in that at least some power module 100 may further include an energy storage unit 150, where the energy storage unit 150 is connected in parallel with the capacitor 140. The second port of the auxiliary power supply unit 120 is in a parallel connection with the energy storage unit 150. With such an arrangement, the output of the auxiliary power supply unit 120 of each power module 100 may receive power from the energy storage unit 150 as an additional power path, thereby increasing the reliability of power supply of the auxiliary power supply unit 120. The energy storage unit 150 may be but not limited to an energy storage battery. More specifically, before the establishment of the power supply for the auxiliary power supply system and without connecting to or providing with the power supply unit 200, the energy storage unit 150 may provide charge to the capacitor 130 of each power module 100 to achieve the establishment of the power supply for its own auxiliary power supply unit, thus it may be guaranteed that the power conversion system is powered reliably.

Embodiment 10

Figure 15A:
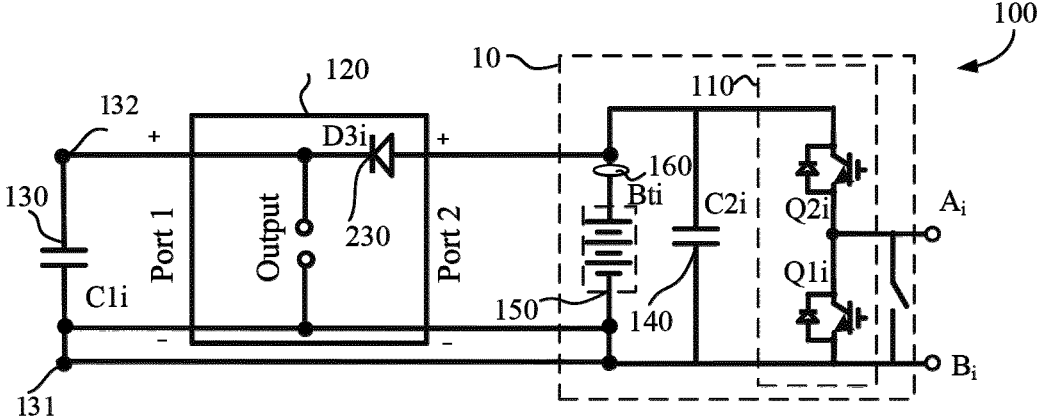
FIG. 15A to FIG. 15D are schematic circuit diagrams of a power module according to an embodiment of the present application.

In the power conversion system shown in FIG. 14, each auxiliary power supply unit 120 includes a third diode 230, as shown in FIG. 15A to FIG. 15D, the third diode 230 is in a series connection between the second port of the auxiliary power supply unit 120 and the output of the auxiliary power supply unit 120. As shown in FIG. 15A, the anode of the third diode 230 is connected to the positive end of the second port of the auxiliary power supply unit 120, the cathode of the third diode 230 is connected to the positive end of the output of the auxiliary power supply unit 120, and the cathode of the third diode 230 is connected to the positive end of the first port of the auxiliary power supply unit 120. One end of the first port of the auxiliary power supply unit 120 is the positive end of the first port of the auxiliary power supply unit 120, one end of the second port of the auxiliary power supply unit 120 is the positive end of the second port of the auxiliary power supply unit 120, and one end of the output of the auxiliary power supply unit 120 is an output positive end of the auxiliary power supply unit 120. Due to the unidirectional conductivity of the diode, when the voltage at the first port of the auxiliary power supply unit 120 is greater than the voltage at the second port of the auxiliary power supply unit 120, the third diode 230 blocks the energy in the energy storage unit 150 from being transferred to the auxiliary power supply unit 120. When the voltage at the first port of the auxiliary power supply unit 120 is less than the voltage at the second port of the auxiliary power supply unit 120, the third diode 230 enables the energy in the energy storage unit 150 to be transferred to the auxiliary power supply unit 120. With such an arrangement, it is achieved that the priorities of the capacitor 130 and the energy storage unit 150 to provide electric energy to the auxiliary power supply unit 120.

Figure 15B:
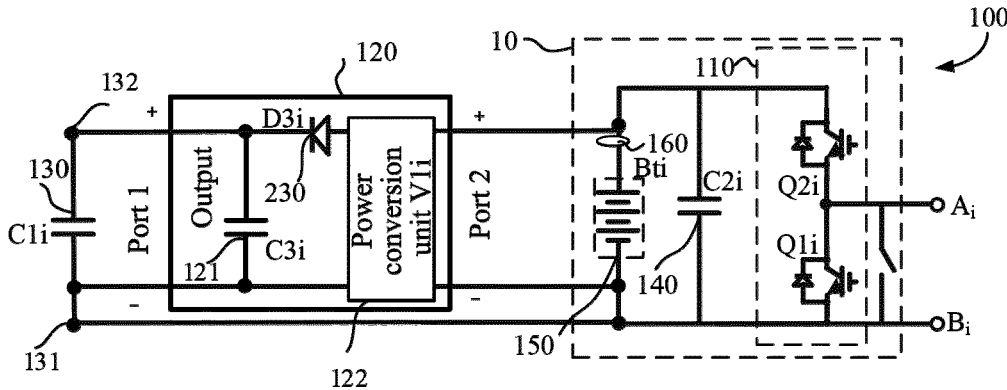
Figure 15C:
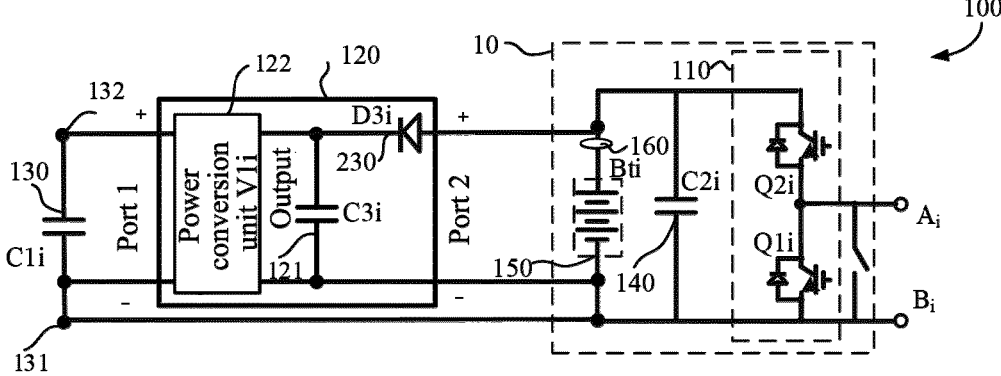
Figure 15D:
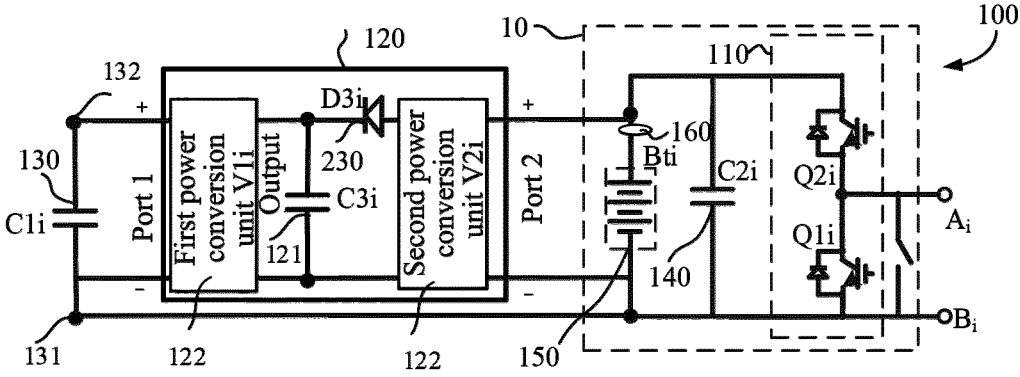

As shown in FIG. 15B to FIG. 15D, when the voltage at the first port and/or the second port of the auxiliary power supply unit 120 is not equal to the voltage required by the auxiliary power supply, it is necessary to adjust the voltage through a power conversion unit, and then provide power to the controller of the power conversion system through the output of the auxiliary power supply unit or provide power to other circuits. The auxiliary power supply unit 120 of each power module 100 may further include at least one power conversion unit 122.

As shown in FIG. 15B, the first auxiliary power supply unit 120 includes a power conversion unit 122, where a first port of the power conversion unit 122 is connected to the output of the first auxiliary power supply unit 120, and a second port of the power conversion unit 122 is connected to the second port of the first auxiliary power supply unit

120. The power conversion unit 122 is configured to convert the voltage at the second port of the auxiliary power supply unit 120 to the voltage at the output of the auxiliary power supply unit 120. The third diode 230 is in a series connection between the output of the first auxiliary power supply unit 120 and the first port of the power conversion unit 122.

More specifically, the anode of the third diode 230 is connected to the positive end of the first port of the power conversion unit 122, the cathode of the third diode 230 is connected to the positive end of the output of the auxiliary power supply unit 120, and one end of the first port of the power conversion unit 122 is the positive end of the first port of the power conversion unit 122. When the voltage at the output of the auxiliary power supply unit 120 is greater than the voltage at the second port of the power conversion unit 122, the third diode 230 blocks the energy in the energy storage unit 150 from being transferred to the auxiliary power supply unit 120. When the voltage at the output of the auxiliary power supply unit 120 is less than the voltage at the power conversion unit 122, the third diode 230 enables the energy in the energy storage unit 150 to be transferred to the auxiliary power supply unit 120.

As shown in FIG. 15C, the first auxiliary power supply unit 120 includes a power conversion unit 122, where a first port of the power conversion unit 122 is connected to the first port of the first auxiliary power supply unit 120, a second port of the power conversion unit 122 is connected to the output of the first auxiliary power supply unit 120, and the power conversion unit 122 is configured to convert the voltage at the first port of the auxiliary power supply unit 120 to the voltage at the output of the auxiliary power supply unit 120. The third diode 230 is in a series connection between the output of the first auxiliary power supply unit 120 and the second port of the first auxiliary power supply unit 120. The third diode 230 has a similar conduction principle to FIG. 15A, and details will not be described here again.

As shown in FIG. 15D, the first auxiliary power supply unit 120 includes two power conversion units, namely a first power conversion unit and a second power conversion unit, where a first port of the first power conversion unit is connected to the first port of the first auxiliary power supply unit 120, and a second port of the first power conversion unit is connected to the output of the first auxiliary power supply unit 120. The power conversion unit is configured to convert the voltage at the first port of the auxiliary power supply unit 120 to the voltage at the output of the auxiliary power supply unit 120. A first port of the second power conversion unit is connected to the output of the first auxiliary power supply unit 120, and a second port of the second power conversion unit is connected to the second port of the first auxiliary power supply unit 120. The power conversion unit is configured to convert the voltage at the second port of the auxiliary power supply unit 120 to the voltage at the output of the auxiliary power supply unit 120. The third diode 230 is in a series connection between the output of the first auxiliary power supply unit 120 and the first port of the second power conversion unit. The third diode 230 has a similar conduction principle to FIG. 15B, and details will not be described here again.

Embodiment 11

As shown in FIG. 15B to FIG. 15D, each auxiliary power supply unit 120 may further include a capacitor 121, where the capacitor 121 is connected to the output of the auxiliary power supply unit 120, and the capacitor 121 is configured to stabilize the voltage at the output of the auxiliary power supply unit 120. It should be noted that, similar to FIG. 15B to FIG. 15D, the capacitor 121 is also applicable to the embodiment shown in FIG. 15A. Taking FIG. 15B as an example, the capacitor C3i of the power module SMi is connected in parallel with the capacitor C1i, where i is a positive integer, and 1≤i≤n. The capacitor C3i may provide power to the controller of the power conversion system, or provide power to other circuits to form redundancy of the capacitor C1i.

Embodiment 12

As shown in FIG. 15A to FIG. 15D, each power module 100 may further include a power sensor 160 for detecting a remaining capacity of the energy storage unit 150 of the power module 100. The power sensor 160 may be a voltage transducer or a current transducer, but not limited thereto. Since the auxiliary power supply unit 120 draws power from the energy storage unit 150, the power sensor 160 is added in each power module 100, so as to detect the remaining capacity of the energy storage unit 150 in real time, thereby protecting the energy storage unit 150 from a calculation error in terms of state of charge (SOC) due to the discharge of a battery to the auxiliary power supply unit 120, thereby affecting battery life and bringing economic losses.

Embodiment 13

Figure 16:
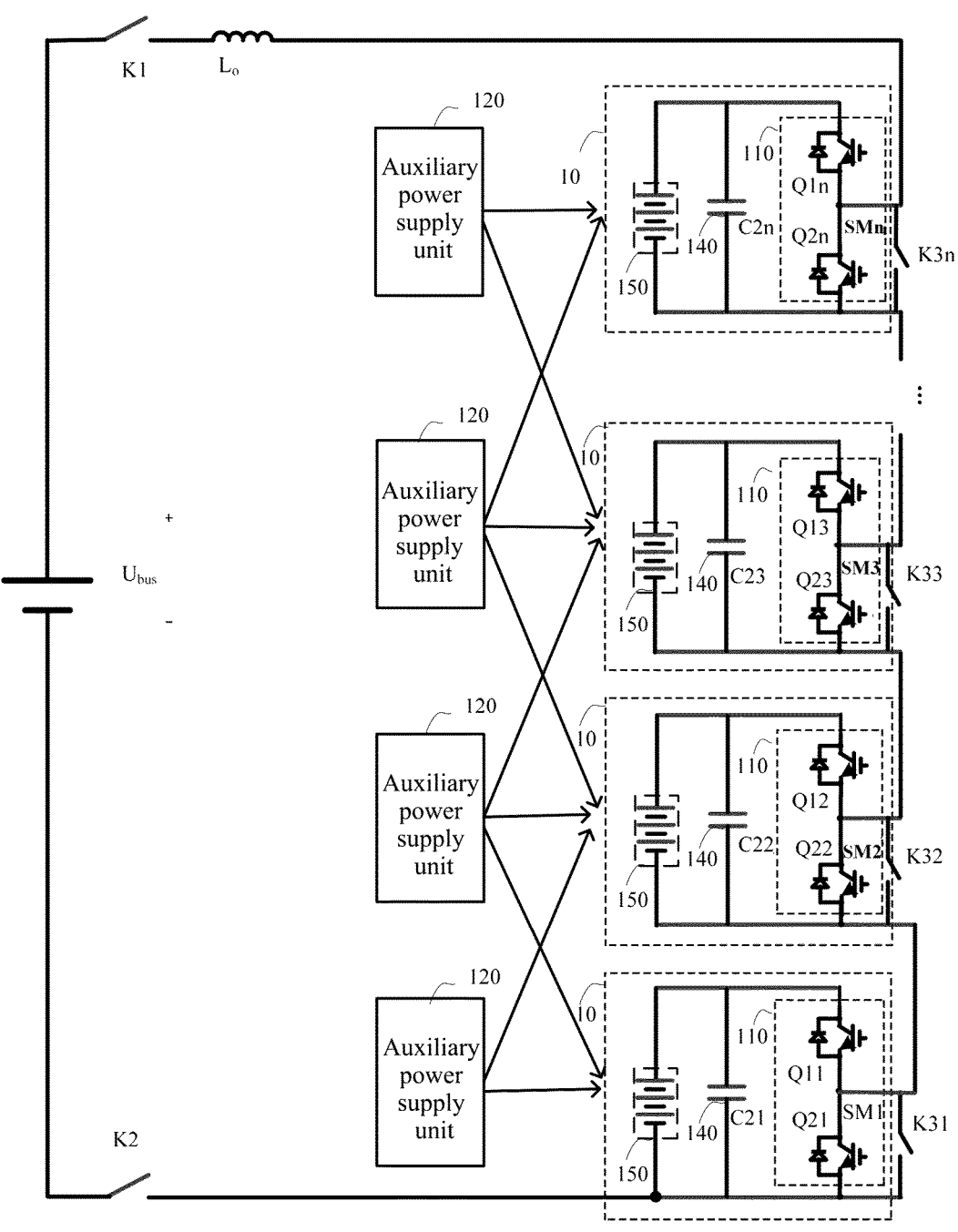
FIG. 16 is a schematic circuit diagram of a power conversion system according to another embodiment of the present application.

As shown in FIG. 16, after the capacitor 130 of each power module 100 of the power conversion system is powered on, each capacitor 130 supplies power to the corresponding auxiliary power supply unit 120, so that the auxiliary power supply unit 120 supplies power to the controller of the power module 100, enabling the power unit 10 of each power module 100 to operate and participate in power conversion, or to be withdrawn from an operation state and enter into redundancy. In order to increase the reliability of operation of each power module 100, the controller of each power module 100 may also draw power from an auxiliary power supply unit 120 of an adjacent power module 100, that is, when one auxiliary power supply unit 120 is faulted, the controller of the corresponding faulted power module 100 may also draw power from an auxiliary power supply unit 120 of an adjacent power module 100.

During an operation of a cascade power conversion system, it is very common for a power module 100 to be bypassed, for example, under a circumstance that the power module 100 includes an energy storage unit 150, if the voltage at the energy storage unit 150 after cascading is greater than the voltage at the direct current bus, some power module 100 will be bypassed to allow for a voltage balance, or when the energy storage unit 150 has an uneven charge and discharge speed, the power module 100 for which energy storage unit 150 has a faster charge and discharge speed will be bypassed first. An energy transfer loop is formed for the capacitor 130 of the auxiliary power supply system by using the first diode 210, so that the capacitor 130 of the bypassed power module 100 may be charged, moreover, when the power module SM1 at the first stage of energy transfer is bypassed, the energy of the capacitor 130 of the power module SM1 may still draw from the power supply unit 200 connected to it, thereby ensuring the reliability of operation of the auxiliary power supply system of the bypassed power module 100.

In some cases, for example, when a cascade power conversion system is shut down for maintenance, its direct current port is disconnected from a direct current bus, an auxiliary power supply system may still be powered by a power supply unit 200, thereby ensuring that a bypass switch is operative to ensure operator safety. In a start-up of the cascade power conversion system, when it has not been connected to the direct current bus and the auxiliary power supply system is unequipped with the power supply unit 200, all power modules 100 would be started by connecting auxiliary power supply units 120 to capacitors 130 of power modules 100 or to energy storage units 150, thereby achieving a standby for reliable start-up of the system. After the auxiliary power supply modules of the cascade system are fully charged, the bypass switches of all power modules 100 may be controlled to turn on, so that the power supply unit 200 simultaneously provides charge to the capacitors 130 of all power modules 100, thereby achieving rapid power-on of the auxiliary power supply system. At the same time, the way in which a second diode 210 is used to connect the capacitor 130 of each power module 100 to the direct current bus for charging is suitable for a scenario with a large power requirement of the load for auxiliary power supply, and a voltage equalization may be achieved for each capacitor 130.

Embodiment 14

Figure 17A:
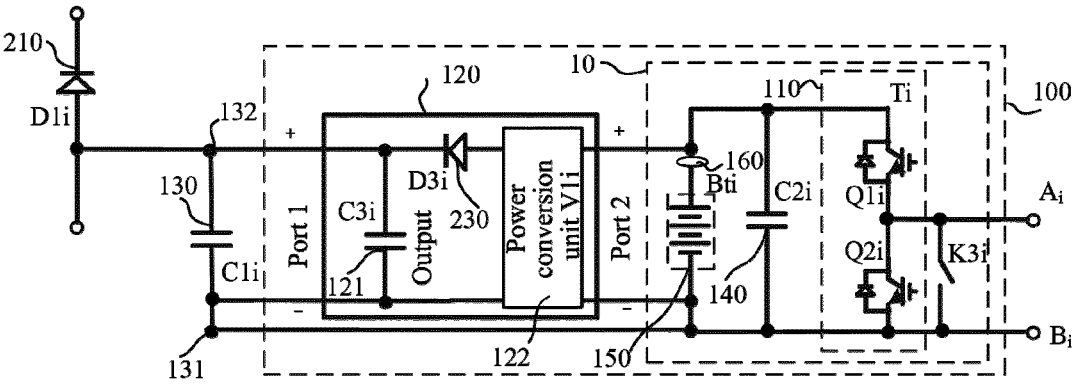
FIG. 17A to FIG. 17D are schematic circuit diagrams of a power conversion module according to yet another embodiment of the present application.
Figure 17B:
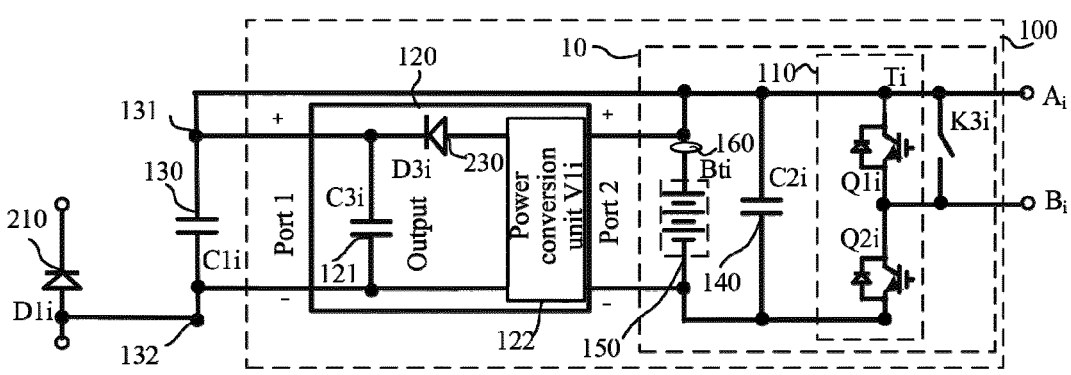
Figure 17C:
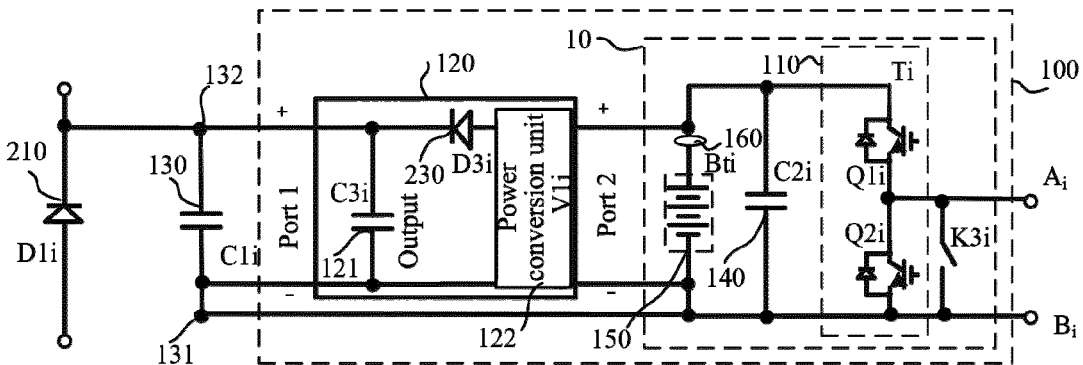
Figure 17D:
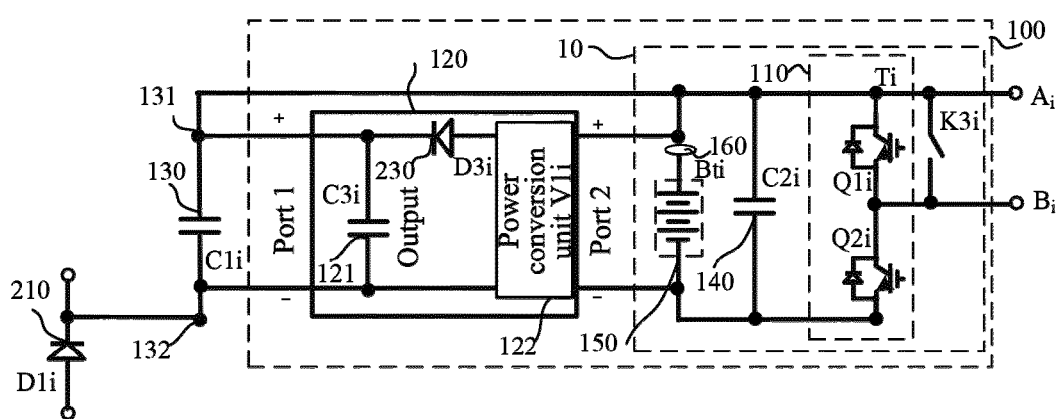

As shown in FIG. 17A to FIG. 17D, some embodiments of the present application also provide a power conversion module. The power conversion module includes a power module 100 and a first diode 210, where the first diode 210 is connected to the power module. The power module includes a switching circuit 110, an auxiliary power supply unit 120, a capacitor 130 and a capacitor 140, where a first port of the switching circuit 110 is connected in parallel with the capacitor 140, a first port of the auxiliary power supply unit 120 is connected in parallel with the capacitor 130, the capacitor 130 is configured to provide charge to the auxiliary power supply unit 120, and a first end 131 of the capacitor 130 is connected to a first end of a second port of the switching circuit 110. As shown in FIG. 17A and FIG. 17B, an anode of the first diode 210 is connected to a second end 132 of the capacitor 130, as shown in FIG. 17C and FIG. 17D, a cathode of the first diode 210 is connected to the second end 132 of the capacitor 130.

Figure 18A:
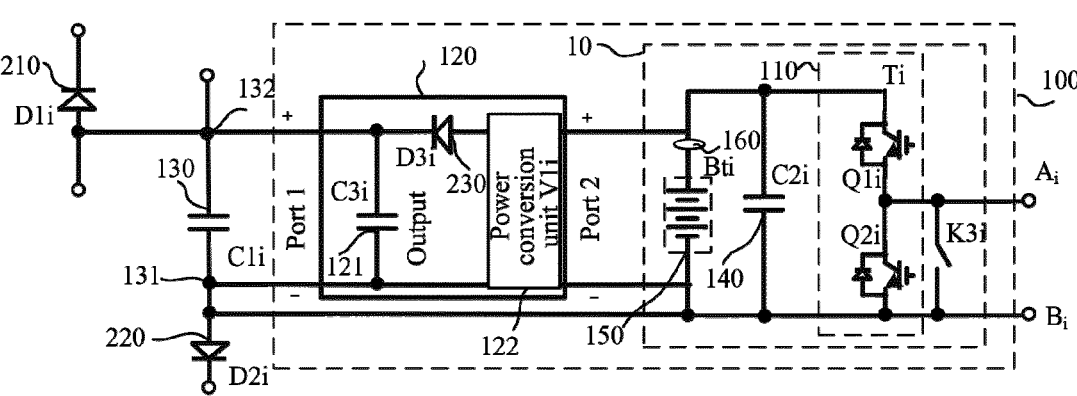
FIG. 18A to FIG. 18H are schematic circuit diagrams of a power conversion module according to yet another embodiment of the present application.
Figure 18B:
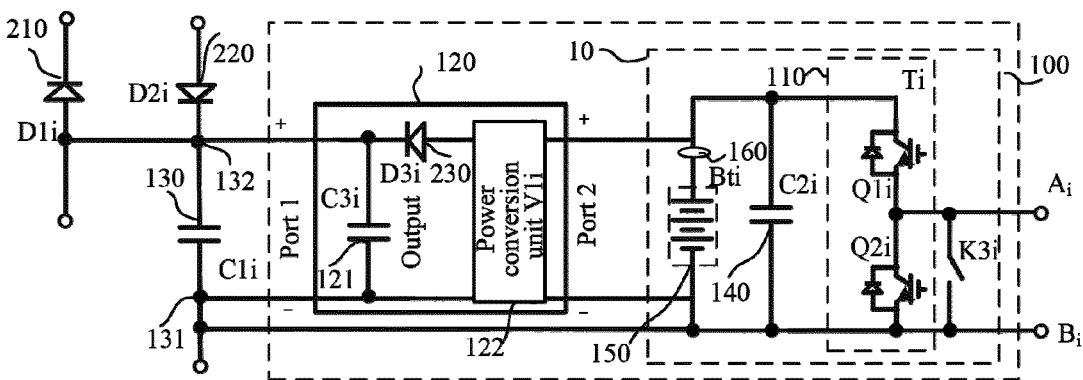
Figure 18C:
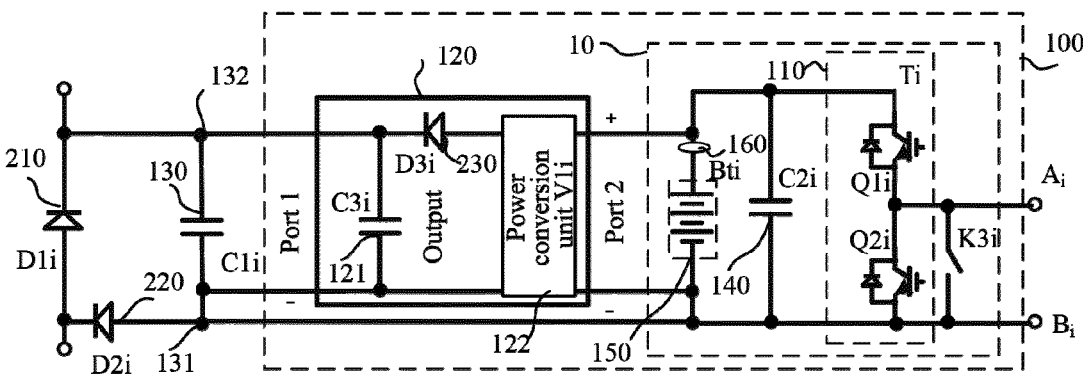
Figure 18D:
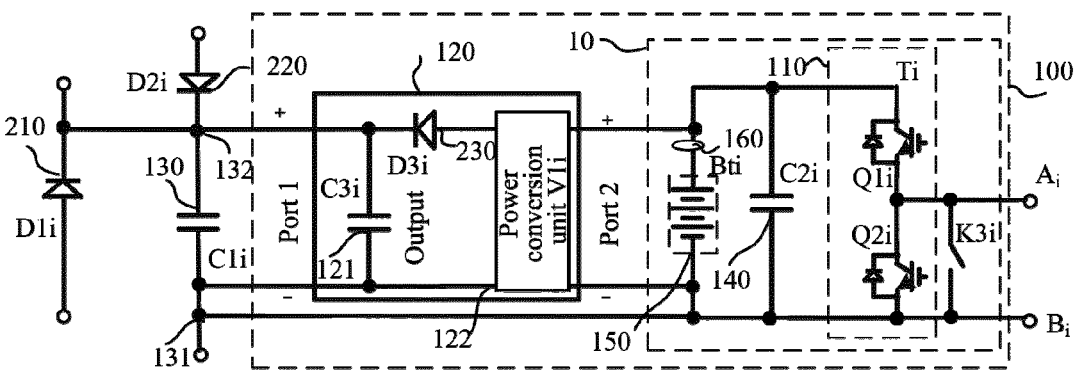

In other embodiments, as shown in FIG. 18A to FIG. 18H, the power conversion module may further include a second diode 220 connected to the power module 100. When the switching circuit 110 is the circuit shown in FIG. 4A, as shown in FIG. 18A, an anode of the first diode 210 is connected to the second end 132 of the capacitor 130, and an anode of the second diode 220 is connected to the first end 131 of the capacitor 130. As shown in FIG. 18B, an anode of the first diode 210 is connected to the second end 132 of the capacitor 130, and a cathode of the second diode 220 is connected to the second end 132 of the capacitor 130. As shown in FIG. 18C, a cathode of the first diode 210 is connected to the second end 132 of the capacitor 130, an anode of the second diode 220 is connected to the first end 131 of the capacitor 130, and an anode of the first diode 210 is connected to the cathode of the second diode 220. As shown in FIG. 18D, a cathode of the first diode 210 is connected to the second end 132 of the capacitor 130, and a cathode of the second diode 220 is connected to the second end 132 of the capacitor 130.

Figure 18E:
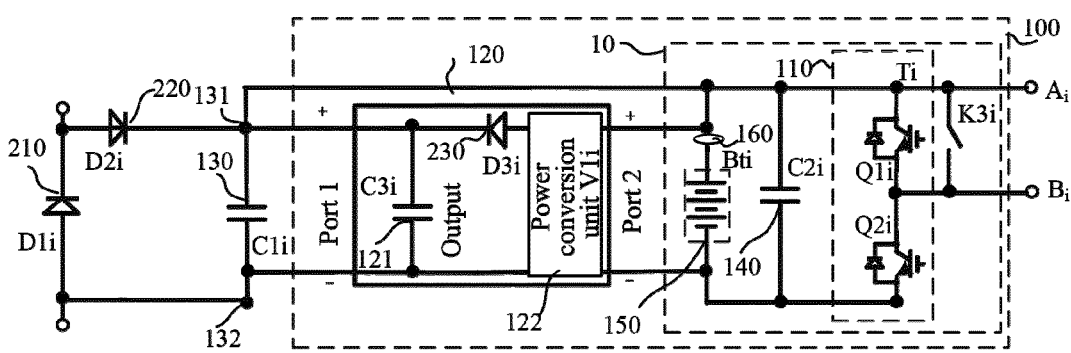
Figure 18F:
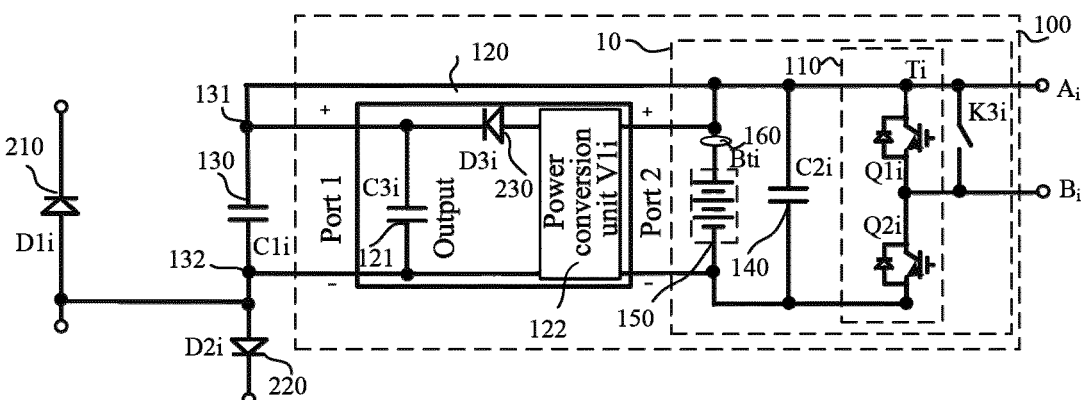
Figure 18G:
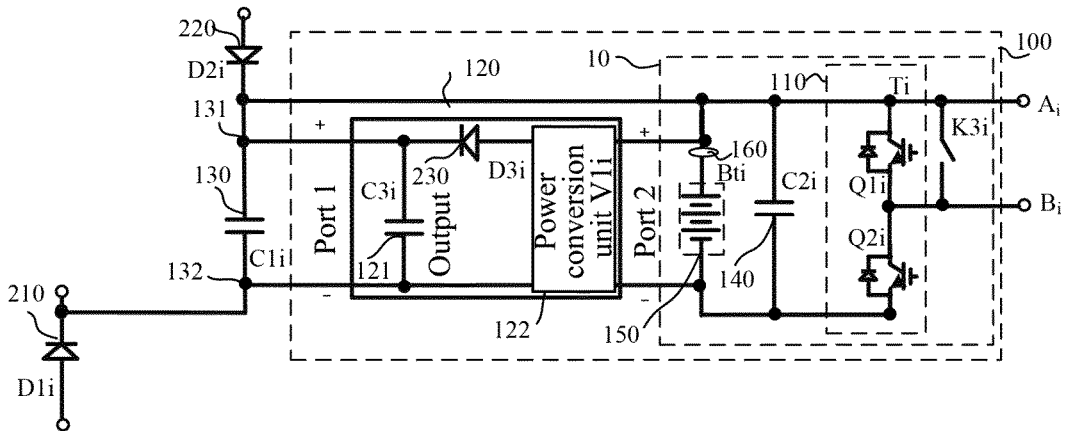
Figure 18H:
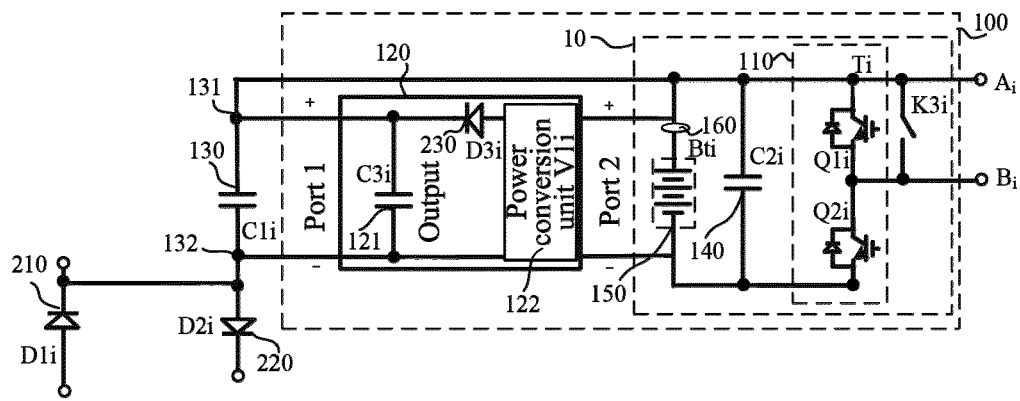

When the switching circuit 110 is the circuit shown in FIG. 4B, as shown in FIG. 18E, an anode of the first diode 210 is connected to the second end 132 of the capacitor 130, an cathode of the second diode 220 is connected to the first end 131 of the capacitor 130, and a cathode of the first diode 210 is connected to the anode of the second diode 220. As shown in FIG. 18F, an anode of the first diode 210 is connected to the second end 132 of the capacitor 130, and an anode of the second diode 220 is connected to the second end 132 of the capacitor 130. As shown in FIG. 18G, a cathode of the first diode 210 is connected to the second end 132 of the capacitor 130, and a cathode of the second diode 220 is connected to the first end 131 of the capacitor 130. As shown in FIG. 18H, a cathode of the first diode 210 is connected to the second end 132 of the capacitor 130, and an anode of the second diode 220 is connected to the second end 132 of the capacitor 130.

In still other embodiments, as shown in FIG. 17A to FIG. 17D and FIG. 18A to FIG. 18H, the power conversion module further includes an energy storage unit 150, where the energy storage unit 150 is connected in parallel with the capacitor 140, and the second port of the auxiliary power supply unit 120 is connected in parallel with the energy storage unit 150. The auxiliary power supply unit 120 includes a third diode, where the third diode is in a series connection between the second port of the first auxiliary power supply unit and the output of the first auxiliary power supply unit.

In still other embodiment, as shown in FIG. 17A to FIG. 17D and FIG. 18A to FIG. 18H, the power conversion module further includes a power sensor 160 for detecting a remaining capacity of the energy storage unit 150 of the power module 100.

It should be noted that the structure of the auxiliary power supply unit 120 in the foregoing embodiments is not limited to the structures shown in FIG. 17A to FIG. 17D and FIG. 18A to FIG. 18H, the auxiliary power supply unit 120 may adopt any of the structures described above in Embodiment 10, Embodiment 11 and Embodiment 12.

In some embodiments, the first auxiliary power supply unit 120 includes a power conversion unit 122. A first port of the power conversion unit 122 is connected to the output of the first auxiliary power supply unit 120, a second port of the power conversion unit 122 is connected to the second port of the first auxiliary power supply unit 120, and the third diode 230 is in a series connection between the output of the first auxiliary power supply unit 120 and the first port of the power conversion unit 122.

In some embodiments, the first port of the power conversion unit 122 is connected to the first port of the first auxiliary power supply unit 120, the second port of the power conversion unit 122 is connected to the output of the first auxiliary power supply unit 120, and the third diode 230 is in a series connection between the output of the first auxiliary power supply unit 120 and the second port of the first auxiliary power supply unit 120.

In some embodiments, the first auxiliary power supply unit 120 includes a first power conversion unit 122 and a second power conversion unit 122; where a first port of the first power conversion unit 122 is connected to the first port of the first auxiliary power supply unit 120, a second port of the first power conversion unit 122 is connected to the output of the first auxiliary power supply unit 120, a first port of the second power conversion unit 122 is connected to the output of the first auxiliary power supply unit 120, a second port of the second power conversion unit 122 is connected to the second port of the first auxiliary power supply unit 120, and the third diode 230 is in a series connection between the output of the first auxiliary power supply unit 120 and the first port of the second power conversion unit 122.

In some embodiments, each auxiliary power supply unit 120 includes a capacitor 121, where the capacitor 121 is connected to the output of the auxiliary power supply unit 120, and the capacitor 121 is configured to stabilize the voltage at the output of the auxiliary power supply unit 120.

Through a cascade connection of power conversion modules having the same structure, the power conversion system described in the foregoing embodiments may be formed. For example, taking the structures shown in FIG. 17A to FIG. 17D as an example, a second port of a switching unit of a power conversion module is connected in series with a second port of a switching unit of a next power conversion module, and an anode of a first diode 210 of a power conversion module is connected to a cathode of a first diode of a next power conversion module. By analogy, the power conversion system described in the foregoing embodiments may be assembled. The structures shown in FIG. 18A to FIG. 18H differ from the structures shown in FIG. 17A to FIG. 17D in that it is also necessary to connect an anode of a second diode 230 of a power conversion module to a cathode of a second diode of a next power conversion module, so as to assemble the power conversion system described in the foregoing embodiments.

In the above-described embodiments, auxiliary power supply for each power unit may be powered with use of a diode, a capacitor and a small number of insulation components, in this way, they are simple in structure, low in cost, and may be modularly designed, thereby addressing the problem in the existing technical solutions of low power density and high insulation requirements resulting from the use of a large number of grid frequency transformers or isolation transformers. The power conversion system and the power conversion module provided according to the present application may be widely used in various modular and multilevel direct current topologies, with a range of voltages from a low voltage to a medium voltage, and a wide application. The simple structure and the low cost are conducive to improving the power density of the system. Power may be drawn effectively in conjunction with a low-voltage power grid, an energy storage unit and a direct current bus, thereby having high power supply reliability, and effectively solving the power supply problem during operation and standby.

Finally, it should be noted that the foregoing embodiments are merely intended for describing the technical solutions of the present application rather than limiting the present application. Although the present application has been described in detail with reference to the foregoing embodiments, persons of ordinarily skill in the art should understand that they may still make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present application.

What is claimed is:

1. A power conversion system, comprising: at least two power modules and at least one first diode, wherein the at least two power modules comprise a first module and a second module;

the first module comprises a first switching circuit, a first auxiliary power supply unit, a first capacitor and a second capacitor, wherein a first port of the first switching circuit is in a parallel connection with the second capacitor, a first port of the first auxiliary power supply unit is in a parallel connection with the first capacitor, the first capacitor is configured to provide charge to the first auxiliary power supply unit, and a first end of the first capacitor is connected to a first end of a second port of the first switching circuit;

the second module comprises a second switching circuit, a second auxiliary power supply unit, a third capacitor and a fourth capacitor, wherein a first port of the second switching circuit is in a parallel connection with the fourth capacitor, a first port of the second auxiliary power supply unit is in a parallel connection with the third capacitor, the third capacitor is configured to provide charge to the second auxiliary power supply unit, and a first end of the third capacitor is connected to a first end of a second port of the second switching circuit;

the second port of the first switching circuit of the first module is in a series connection with the second port of the second switching circuit of the second module, and two ends of the first diode are connected to the first capacitor and the third capacitor, respectively.

2. The power conversion system according to claim 1, further comprising:

a controller, configured to control a corresponding switch of the first switching circuit of the first module to turn on to output a zero voltage level, such that energy of the first capacitor of the first module is transmitted to the third capacitor of the second module.

3. The power conversion system according to claim 1, further comprising:

a power supply unit, connected to the first capacitor of the first module and/or the third capacitor of the second module.

4. The power conversion system according to claim 1, further comprising:

a second diode, wherein the first capacitor, the second diode and the third capacitor are connected in series successively to form a first branch, and two ends of the first branch are electrically connected to positive and negative ends of a direct current bus, respectively.

5. The power conversion system according to claim 1, wherein a second end of the first capacitor is connected to an anode of the first diode, and a second end of the third capacitor is connected to a cathode of the first diode.

6. The power conversion system according to claim 5, wherein the second end of the first capacitor is connected to a cathode of the second diode, and the first end of the third capacitor is connected to an anode of the second diode.

7. The power conversion system according to claim 1, wherein a second end of the first capacitor is connected to a cathode of the first diode, and an anode of the first diode is connected to a second end of the third capacitor.

8. The power conversion system according to claim 7, wherein the second end of the first capacitor is connected to an anode of the second diode, and the first end of the third capacitor is connected to a cathode of the second diode.

9. The power conversion system according to claim 1, wherein the first module further comprises a first energy storage unit connected in parallel with the second capacitor.

10. The power conversion system according to claim 9, wherein a second port of the first auxiliary power supply unit is in a parallel connection with the first energy storage unit, the first auxiliary power supply unit comprises a third diode, and the third diode is in a series connection between the second port of the first auxiliary power supply unit and an output of the first auxiliary power supply unit.

11. The power conversion system according to claim 10, wherein:

the first auxiliary power supply unit comprises a power conversion unit; a first port of the power conversion unit is connected to the output of the first auxiliary power supply unit, a second port of the power conversion unit is connected to the second port of the first auxiliary power supply unit, and the third diode is in a series connection between the output of the first auxiliary power supply unit and the first port of the power conversion unit;

or the first auxiliary power supply unit comprises a power conversion unit; a first port of the power conversion unit is connected to the first port of the first auxiliary power supply unit, a second port of the power conversion unit is connected to the output of the first auxiliary power supply unit, and the third diode is in a series connection between the output of the first auxiliary power supply unit and the second port of the first auxiliary power supply unit;

or the first auxiliary power supply unit comprises a first power conversion unit and a second power conversion unit; a first port of the first power conversion unit is connected to the first port of the first auxiliary power supply unit, a second port of the first power conversion unit is connected to the output of the first auxiliary power supply unit, a first port of the second power conversion unit is connected to the output of the first auxiliary power supply unit, a second port of the second power conversion unit is connected to the second port of the first auxiliary power supply unit, and the third diode is in a series connection between the output of the first auxiliary power supply unit and the first port of the second power conversion unit.

12. The power conversion system according to claim 9, wherein the first module is further provided with a power sensor for detecting a remaining capacity of the first energy storage unit.

13. The power conversion system according to claim 1, wherein each of the second ports of the first switching circuit and the second switching circuit further comprises a bypass switch.

14. The power conversion system according to claim 1, wherein the first switching circuit is a half-bridge circuit.

15. The power conversion system according to claim 1, wherein the second switching circuit is a full-bridge circuit.

16. A power conversion module, comprising: a first module, and a first diode connected to the first module;

wherein the first module comprises a first switching circuit, a first auxiliary power supply unit, a first capacitor, and a second capacitor;

a first port of the first switching circuit is in a parallel connection with the second capacitor, a first port of the first auxiliary power supply unit is in a parallel connection with the first capacitor, the first capacitor is configured to provide charge to the first auxiliary power supply unit, and a first end of the first capacitor is connected to a first end of a second port of the first switching circuit.

17. The power conversion module according to claim 16, comprising any one of the following:

an anode of the first diode is connected to a second end of the first capacitor;

a cathode of the first diode is connected to a second end of the first capacitor.

18. The power conversion module according to claim 16, further comprising: a second diode connected to the first module.

19. The power conversion module according to claim 18, comprising any one of the following:

an anode of the first diode is connected to a second end of the first capacitor, and an anode of the second diode is connected to the first end of the first capacitor;

an anode of the first diode is connected to a second end of the first capacitor, and an anode of the second diode is connected to the second end of the first capacitor;

a cathode of the first diode is connected to a second end of the first capacitor, an anode of the second diode is connected to the first end of the first capacitor, and an anode of the first diode is connected to a cathode of the second diode;

a cathode of the first diode is connected to a second end of the first capacitor, and a cathode of the second diode is connected to the second end of the first capacitor.

20. The power conversion module according to claim 18, comprising any one of the following:

an anode of the first diode is connected to a second end of the first capacitor, an cathode of the second diode is connected to the first end of the first capacitor, and an cathode of the first diode is connected to an anode of the second diode;

an anode of the first diode is connected to a second end of the first capacitor, and an anode of the second diode is connected to the second end of the first capacitor;

a cathode of the first diode is connected to a second end of the first capacitor, and a cathode of the second diode is connected to the first end of the first capacitor;

a cathode of the first diode is connected to a second end of the first capacitor, and an anode of the second diode is connected to the second end of the first capacitor.

21. The power conversion module according to claim 16, wherein the first module further comprises a first energy storage unit connected in parallel with the second capacitor;

a second port of the first auxiliary power supply unit is in a parallel connection with the first energy storage unit, the first auxiliary power supply unit comprises a third diode, and the third diode is in a series connection between the second port of the first auxiliary power supply unit and an output of the first auxiliary power supply unit.

22. The power conversion module according to claim 21, wherein:

the first auxiliary power supply unit comprises a power conversion unit; a first port of the power conversion unit is connected to the output of the first auxiliary power supply unit, a second port of the power conversion unit is connected to the second port of the first auxiliary power supply unit, and the third diode is in a series connection between the output of the first auxiliary power supply unit and the first port of the power conversion unit;

or the first auxiliary power supply unit comprises a power conversion unit; a first port of the power conversion unit is connected to the first port of the first auxiliary power supply unit, a second port of the power conversion unit is connected to the output of the first auxiliary power supply unit, and the third diode is in a series connection between the output of the first auxiliary power supply unit and the second port of the first auxiliary power supply unit;

or the first auxiliary power supply unit comprises a first power conversion unit and a second power conversion unit; a first port of the first power conversion unit is connected to the first port of the first auxiliary power supply unit, a second port of the first power conversion unit is connected to the output of the first auxiliary power supply unit, a first port of the second power conversion unit is connected to the output of the first auxiliary power supply unit, a second port of the second power conversion unit is connected to the second port of the first auxiliary power supply unit, and the third diode is in a series connection between the output of the first auxiliary power supply unit and the first port of the second power conversion unit.

* * * * *